US011496271B2

(12) United States Patent
Sugaya

(10) Patent No.: US 11,496,271 B2
(45) Date of Patent: *Nov. 8, 2022

(54) DEVICE THAT CONVEY DATA FOR A BLOCK ACKNOWLEDGE (ACK)

(71) Applicant: Sony Corporation, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/916,163

(22) Filed: Jun. 30, 2020

(65) Prior Publication Data
US 2020/0336267 A1 Oct. 22, 2020

Related U.S. Application Data

(63) Continuation of application No. 15/740,423, filed as application No. PCT/JP2016/067445 on Jun. 10, 2016, now Pat. No. 10,728,006.

(30) Foreign Application Priority Data

Aug. 27, 2015 (JP) .............................. JP2015-167579

(51) Int. Cl.
H04L 5/00 (2006.01)
H04W 28/04 (2009.01)
(Continued)

(52) U.S. Cl.
CPC .......... H04L 5/0055 (2013.01); H04L 1/1614 (2013.01); H04L 1/1671 (2013.01);
(Continued)

(58) Field of Classification Search
CPC ... H04L 5/0055; H04L 1/1614; H04L 1/1671; H04L 1/1685; H04L 29/08; H04L 69/324;
(Continued)

(56) References Cited

U.S. PATENT DOCUMENTS 8,627,074 B1  1/2014 Goel et al.
8,898,466 B1  11/2014 Goel et al.
(Continued)

FOREIGN PATENT DOCUMENTS

JP         4223513 B2    2/2009
JP      2013-102433 A    5/2013

OTHER PUBLICATIONS

International Search Report dated Aug. 23, 2016 in PCT/JP2016/067445 filed Jun. 10, 2016.

Primary Examiner — Ian N Moore
Assistant Examiner — Brian T Le
(74) Attorney, Agent, or Firm — Xsensus LLP

(57) ABSTRACT

A communication device includes transceiver circuitry that transmits a first frame including a request parameter and at least one piece of data for a block acknowledge (ACK); and receives a second frame including a confirmation response to a response parameter and the block ACK. The transceiver circuitry receives a request for the at least one piece of data for the block ACK, transmits the first frame on a basis of occurrence of the request for transmitting the at least one piece of data of the block ACK, and executes transmission of a data frame based on the response parameter included in the received second frame.

18 Claims, 17 Drawing Sheets

(51) Int. Cl.
*H04W 84/12* (2009.01)
*H04L 65/40* (2022.01)
*H04L 69/324* (2022.01)
*H04L 1/16* (2006.01)

(52) U.S. Cl.
CPC ............ *H04L 1/1685* (2013.01); *H04L 65/40* (2013.01); *H04L 69/324* (2013.01); *H04W 28/04* (2013.01); *H04W 84/12* (2013.01)

(58) Field of Classification Search
CPC . H04L 1/00; H04L 12/40; H04L 12/42; H04L 12/44; H04L 47/10; H04W 28/04; H04W 84/12
See application file for complete search history.

(56) References Cited

U.S. PATENT DOCUMENTS

| | | |
|---|---|---|
| 2006/0203752 A1 | 9/2006 | Ginzburg |
| 2007/0162813 A1 | 7/2007 | Nakashima |
| 2012/0014335 A1 | 1/2012 | Adachi et al. |
| 2013/0039180 A1 | 2/2013 | Hong |
| 2013/0114622 A1 | 5/2013 | Veyseh et al. |
| 2018/0034595 A1* | 2/2018 | Kim ...................... H04L 1/1614 |

* cited by examiner

FIG. 7

Block ACK Initiate Frame

| MAC Header | | | | | | | | Block ACK Initiate Parameter | Data Payload | FCS |
|---|---|---|---|---|---|---|---|---|---|---|
| Frame Control | Duration /ID | Address 1 | Address 2 | Address 3 | Sequence Control | Address 4 | QoS Control | HT Control | | | |
| 2 Octets | 2 Octets | 6 Octets | 6 Octets | 6 Octets | 2 Octets | 6 Octets | 2 Octets | 2 Octets | 8 Octets | Variable | 4 Octets |

| Block ACK Action | Dialog Token | Block ACK Parameter Set | | | | Block ACK Timeout Value | Block ACK Starting Sequence Control | |
|---|---|---|---|---|---|---|---|---|
| | | A-MSDU Supported | Block ACK Policy | TID | Buffer Size | | Fragment Number | Starting Sequence Number |
| 1 Octet | 1 Octet | 2 Octets | | | | 2 Octets | 2 Octets | |

FIG. 8

DEVICE THAT CONVEY DATA FOR A BLOCK ACKNOWLEDGE (ACK)

CROSS-REFERENCE TO RELATED APPLICATIONS

The present application is a continuation of U.S. application Ser. No. 15/740,423, filed Dec. 28, 2017, which is based on PCT filing PCT/JP2016/067445, filed Jun. 10, 2016, which claims priority to JP 2015-167579, filed Aug. 27, 2015, the entire contents of each are incorporated herein by reference.

TECHNICAL FIELD

The present disclosure relates to a communication device and a communication method.

BACKGROUND ART

In recent years, wireless local area networks (LANs) typified by Institute of Electrical and Electronics Engineers (IEEE) 802.11 have spread. In addition, with the wireless LANs, products corresponding to the wireless LANs (hereinafter also referred to as wireless communication devices) have also increased. When wireless communication devices increase, there is a high possibility of communication efficiency deteriorating. Therefore, it is desirable to improve the communication efficiency.

As methods of improving communication efficiency, for example, there are technologies for block acknowledgement (ACK) (hereinafter also referred to as block ACK (BA)). In the technologies, when ACK information regarding a plurality of pieces of received data is transmitted using one BA frame, communication resources necessary for communication of the ACK information are reduced. As a result, communication efficiency is improved.

For example, Patent Literature 1 discloses a communication method of switching a block ACK scheme to a normal ACK scheme by opening resources ensured for the block ACK scheme in a case in which a data frame of the block ACK scheme is not received within a predetermined period.

CITATION LIST

Patent Literature

Patent Literature 1: Japanese Patent No. 4223513

DISCLOSURE OF INVENTION

Technical Problem

However, in a block ACK of the related art including the method disclosed in Patent Literature 1, there is a possibility of a communication overhead increasing. For example, in the IEEE 802.11 standard, an ADDBA process is performed beforehand to start a series of communication processes using a block ACK between communication devices (hereinafter also referred to as a BA sequence). For this reason, a slight communication overhead occurs until transmission of a data frame starts. Then, when start and stop of the BA sequence is repeated, the communication overhead accumulates each time. As a result, the communication overhead in the whole communication increases.

Accordingly, the present disclosure proposes a novel and improved communication device and a novel and improved communication method capable of reducing a communication overhead occurring in use of a block ACK.

Solution to Problem

According to the present disclosure, there is provided a communication device including: a communication unit configured to transmit a first frame including a request parameter and at least one piece of data for a block acknowledge (ACK) and receive a second frame including a confirmation response to a response parameter and the data for the block ACK.

In addition, according to the present disclosure, there is provided a communication device including: a communication unit configured to receive a first frame including a request parameter and at least one piece of data for a block acknowledge (ACK) and transmit a second frame including a confirmation response to a response parameter and the data for the block ACK.

In addition, according to the present disclosure, there is provided a communication method including: transmitting, by a communication unit, a first frame including a request parameter and at least one piece of data for a block acknowledge (ACK); and receiving a second frame including a confirmation response to a response parameter and the data for the block ACK.

In addition, according to the present disclosure, there is provided a communication method including: receiving, by a communication unit, a first frame including a request parameter and at least one piece of data for a block acknowledge (ACK); and transmitting a second frame including a confirmation response to a response parameter and the data for the block ACK.

Advantageous Effects of Invention

According to the present disclosure, as described above, it is possible to provide a communication device and a communication method capable of reducing a communication overhead occurring in use of a block ACK. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a diagram illustrating a configuration example of a BA start frame according to the embodiment.

FIG. 8 is a diagram illustrating a configuration example of a BA response frame according to the embodiment.

MODE(S) FOR CARRYING OUT THE INVENTION

Figure 1:
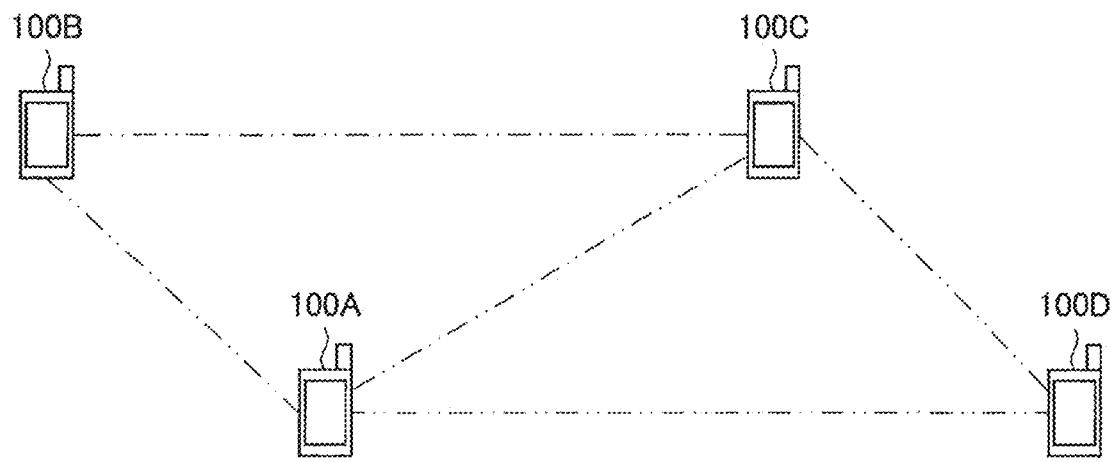
FIG. 1 is a diagram illustrating a configuration example of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are also cases in which a plurality of components having substantially the same function and structure are distinguished by adding different numbers to the end of the same reference numeral. For example, a plurality of components having substantially the same function are distinguished as necessary like a communication device 100A and a communication device 100B. However, in a case where it is unnecessary to distinguish components having substantially the same function and structure, only the same reference numeral is added. For example, in a case where it is unnecessary to particularly distinguish the communication device 100A and the communication device 100B, they are referred to as simply as a "communication device 100."

Moreover, the description will be made in the following order.
1. Problem of technology of related art
2. Communication device according to embodiment of the present disclosure
2-1. Configuration of communication device
2-2. Technical features
2-3. Process of communication device
2-4. Conclusion of embodiment of the present disclosure
2-5. Modification examples
3. Application examples
4. Conclusion

1. Overview of Communication System According to Embodiment of the Present Disclosure and Problem of Technology of the Related Art First, an overview of a communication system according to an embodiment of the present disclosure and a problem of the technology of the related art will be described with reference to FIG. 1. FIG. 1 is a diagram illustrating a configuration example of a communication system according to an embodiment of the present disclosure.

The communication system includes a plurality of communication devices 100. The communication device 100 has a data frame communication function and a BA communication function. Specifically, the communication device 100 transmits a data frame or a BA request frame and receives a BA frame as a response to the data frame. In addition, the communication device 100 receives a data frame or a BA request frame and transmits a BA frame as a response to the data frame.

For example, the communication system includes communication devices 100A to 100D, as illustrated in FIG. 1. The communication device 100A transmits a plurality of data frames or BA request frames to the communication devices 100B to 100D. The communication devices 100B to 100D transmit a plurality of received data frames or BA frames as responses to BA request frames to the communication device 100A. Moreover, the communication device 100A may operate as an AP and the communication devices 100B to 100D may operate as STAs.

ADDBA Process

Figure 2:
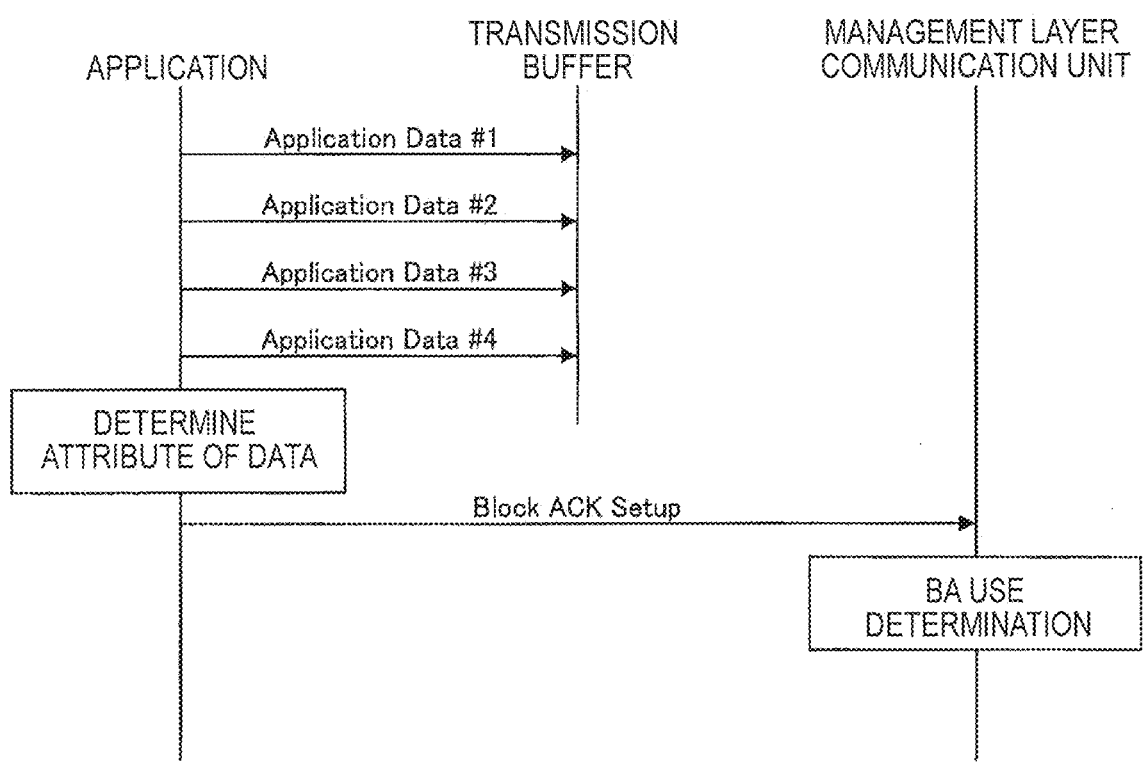
FIG. 2 is an explanatory diagram illustrating a sequence of an ADDBA process of the related art.
Figure 3:
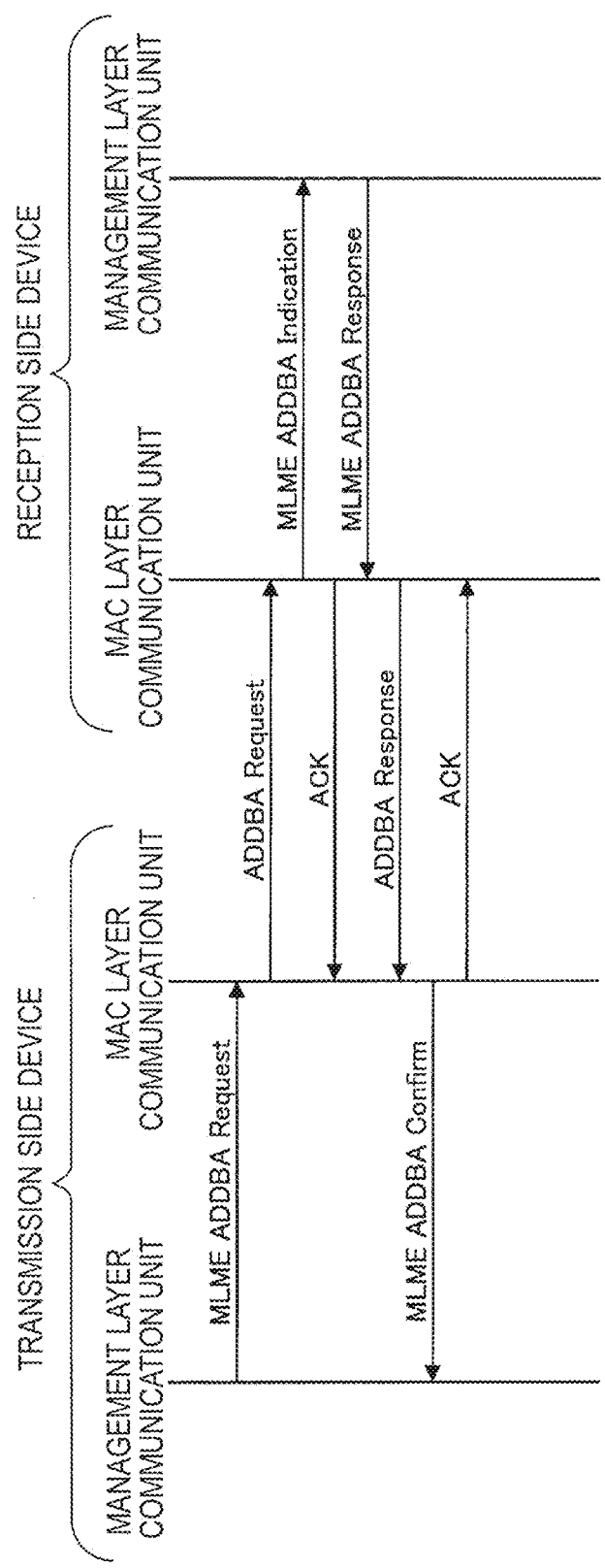
FIG. 3 is an explanatory diagram illustrating a sequence of an ADDBA process of the related art.

Here, in a BA technology of the related art, a preliminary process is performed to start a BA sequence. For example, in the IEEE 802.11 standard, an ADDBA process is performed to start the BA sequence. Further, the ADDBA process will be described in detail with reference to FIGS. 2 and 3. FIGS. 2 and 3 are explanatory diagrams illustrating a sequence of an ADDBA process of the related art.

A communication device of the related art may include an application, a transmission buffer, and a management layer communication unit. The application stores data desired to be caused to be transmitted to an application of another communication device in the transmission buffer. For example, as illustrated in FIG. 2, the application stores application data #1 to #4 desired to be transmitted to the application of the other communication device in the transmission buffer.

Subsequently, the application determines an attribute of data desired to be caused to be transmitted and notifies the management layer communication unit of a BA setting request on the basis of a determination result. For example, the application determines whether data to be stored in the transmission buffer has continuity. In a case in which it is determined that the data has the continuity, the management layer communication unit is notified of block ACK setup illustrated in FIG. 2.

Subsequently, the management layer communication unit executes BA use determination on the basis of the BA setting request notified of by the application. For example, when the BA setting request is notified of by the application, the management layer communication unit determines the BA use determination on the basis of whether the BA can be used. Moreover, in the BA use determination, information other than the BA setting request can be used.

Next, a BA setting sequence will be described with reference to FIG. 3. Moreover, hereinafter, a communication device requesting BA setting is referred to as a transmission side device and a communication device requested to execute the BA setting is referred to as a reception side device.

First, when it is determined that the transmission side device will use the BA, a BA setting request frame is transmitted to the reception side device. For example, when it is determined that the BA will be used, the management layer communication unit generates a MAC layer management entity (MLME) ADDBA request illustrated in FIG. 3. Subsequently, a MAC layer communication unit transmits an ADDBA request frame to the reception side device on the basis of the MLME ADDBA request.

The reception side device receiving the BA setting request frame transmits an ACK frame as a confirmation response to the BA setting request frame to the transmission side device. For example, when the ADDBA request frame is received, the MAC layer communication unit generates an MLME ADDBA indication and notifies the management layer communication unit of the generated MLME ADDBA indication, as illustrated in FIG. 3.

Subsequently, the reception side device acquires BA parameter information included in the BA setting request frame and transmits a BA setting response frame as a response to the BA setting request frame to the transmission side device when the BA can be used. For example, as illustrated in FIG. 3, the management device communication unit generates an MLME ADDBA response. Subsequently, the MAC layer communication unit transmits an ADDBA response frame to the transmission side device on the basis of the generated MLME ADDBA response.

The transmission side device receiving the BA setting response frame transmits an ACK frame as a confirmation response to the BA setting response frame to the reception side device. For example, when the ADDBA response frame is received, the MAC layer communication unit generates an MLME ADDBA confirm and notifies the management layer communication unit of the generated MLME ADDBA confirm, as illustrated in FIG. 3. Then, the MAC layer communication unit acquires the BA parameter information included in the BA setting response frame, and thus the fact that the BA will be used is shared between the transmission side device and the reception side device.

When the sequence related to the ADDBA process ends, the BA sequence starts. When BA sequence starts, communication of a data frame and a BA frame is executed using the BA parameter information set in the ADDBA process until the BA sequence ends.

DELBA Process

The process executed to start the BA sequence has been described above, but there is also a process executed to end the BA sequence. For example, in the IEEE 802.11 standard, a DELBA process is executed to end the BA sequence.

Figure 4:
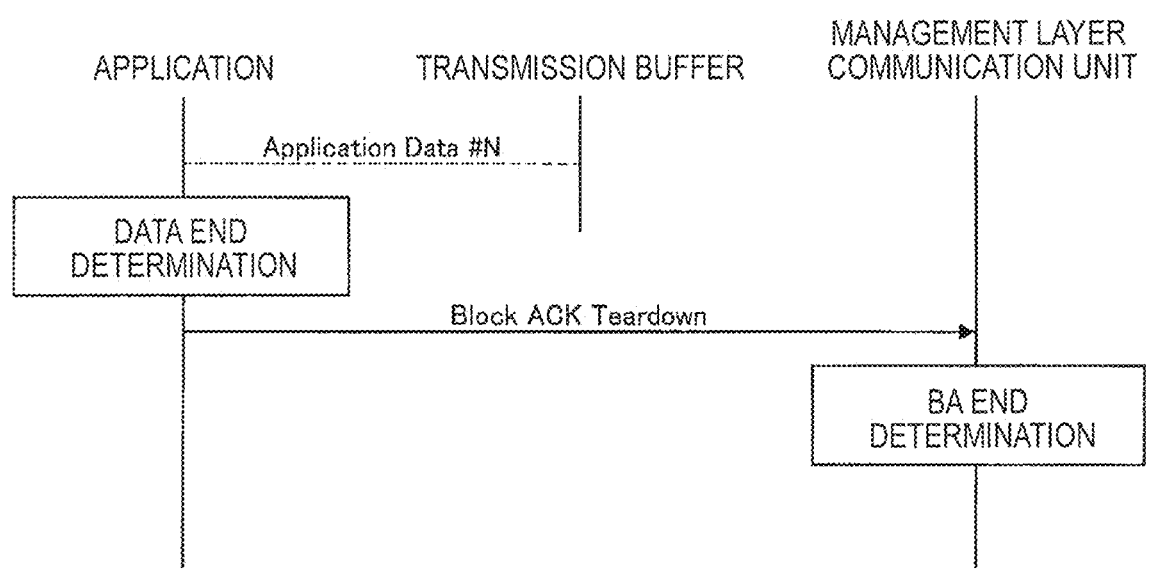
FIG. 4 is an explanatory diagram illustrating a sequence of a DELBA process of the related art.
Figure 5:
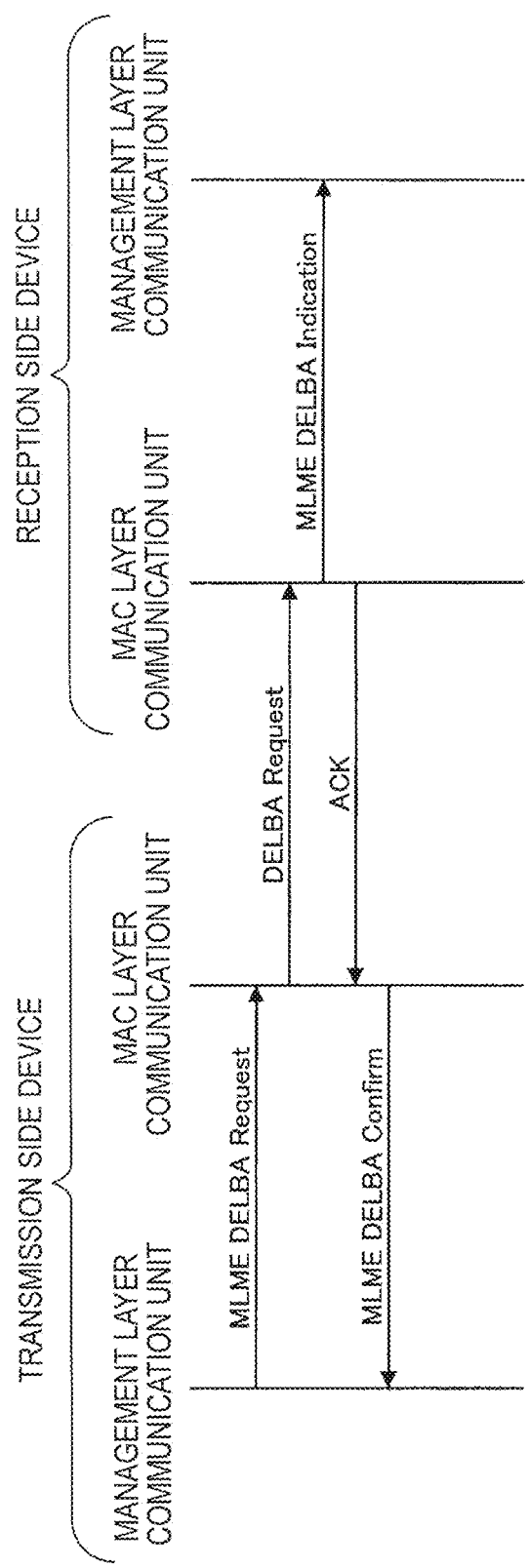
FIG. 5 is an explanatory diagram illustrating a sequence of a DELBA process of the related art.

Further, the DELBA process will be described in detail with reference to FIGS. 4 and 5. FIGS. 4 and 5 are explanatory diagrams illustrating a sequence of the DELBA process of the related art.

The application determines whether storing of data desired to be caused to be transmitted to the application of another communication device in the transmission buffer is stopped. For example, the application determines whether a predetermined time has passed after application data #N desired to be transmitted to the application of the other communication device is stored, as illustrated in FIG. 4.

In a case in which it is determined that the storing of the data in the transmission buffer is stopped, the application notifies the management layer communication unit of a BA end request. For example, in a case in which the application determines that the predetermined time has passed after application data #N is stored in the transmission buffer, the application notifies the management layer communication unit of a block ACK teardown illustrated in FIG. 4.

Subsequently, the management layer communication unit executes BA end determination on the basis of a BA end request notified of by the application. For example, when the application notifies the management layer communication unit of the BA end request, the management layer communication unit executes BA sequence end determination on the basis of the BA end request.

Next, the BA end sequence will be described with reference to FIG. 5.

First, when it is determined that the BA sequence will end, the transmission side device transmits a BA end request frame to the reception side device. For example, when it is determined that the BA sequence will end, the management layer communication unit generates an MLME DELBA request illustrated in FIG. 5 and the MAC layer communication unit transmits a DELBA request frame to the reception side device on the basis of the MLME DELBA request.

The reception side device receiving the BA end request frame transmits an ACK frame as a confirmation response to the BA end request frame to the transmission side device. For example, when the DELBA request frame is received, the MAC layer communication unit generates an MLME DELBA indication and notifies the management layer communication unit of the generated MLME DELBA indication, as illustrated in FIG. 5. Further, the reception side communication device acquires a parameter included in the BA end request frame and specifies an end target BA sequence.

When the sequence related to the DELBA process ends, the BA sequence ends.

Here, in the process related to the BA sequence of the related art described above, a communication overhead may increase. For example, before transmission of a data frame, an ADDBA process is executed to start a BA sequence. In the ADDBA process, as described above, the BA setting request frame and the BA setting response frame are exchanged and the ACK frames to these frames are communicated, as described above. Therefore, the communication overhead increases whenever the ADDBA process is executed. As a result, a throughput of the whole communication deteriorates.

Accordingly, the present disclosure proposes a communication device and a communication system capable of reducing a communication overhead occurring in use of a block ACK compared to a communication overhead occurring in use of a block ACK sequence of the related art. Hereinafter, the details of the communication device and the communication system will be described. Moreover, as described above, in FIG. 1, the communication device 100A may be the AP and the other communication devices 100B to 100D may be STAs as an example of the communication system. However, the communication devices 100A to 100D may all be STAs and one of the STAs may be a communication device that has a plurality of direct links to the other STAs. In this case, the above-described downlink can be said to be "simultaneous transmission from one STA to the plurality of STAs" and the above-described uplink can be said to be "simultaneous transmission from the plurality of STAs to one STA."

2. Communication Device According to Embodiment of the Present Disclosure

The overview of the communication system according to the embodiment of the present disclosure and the problem of the technology of the related art have been described above. Next, the communication device 100 according to an embodiment of the present disclosure will be described.

2-1. Configuration of Communication Device

Figure 6:
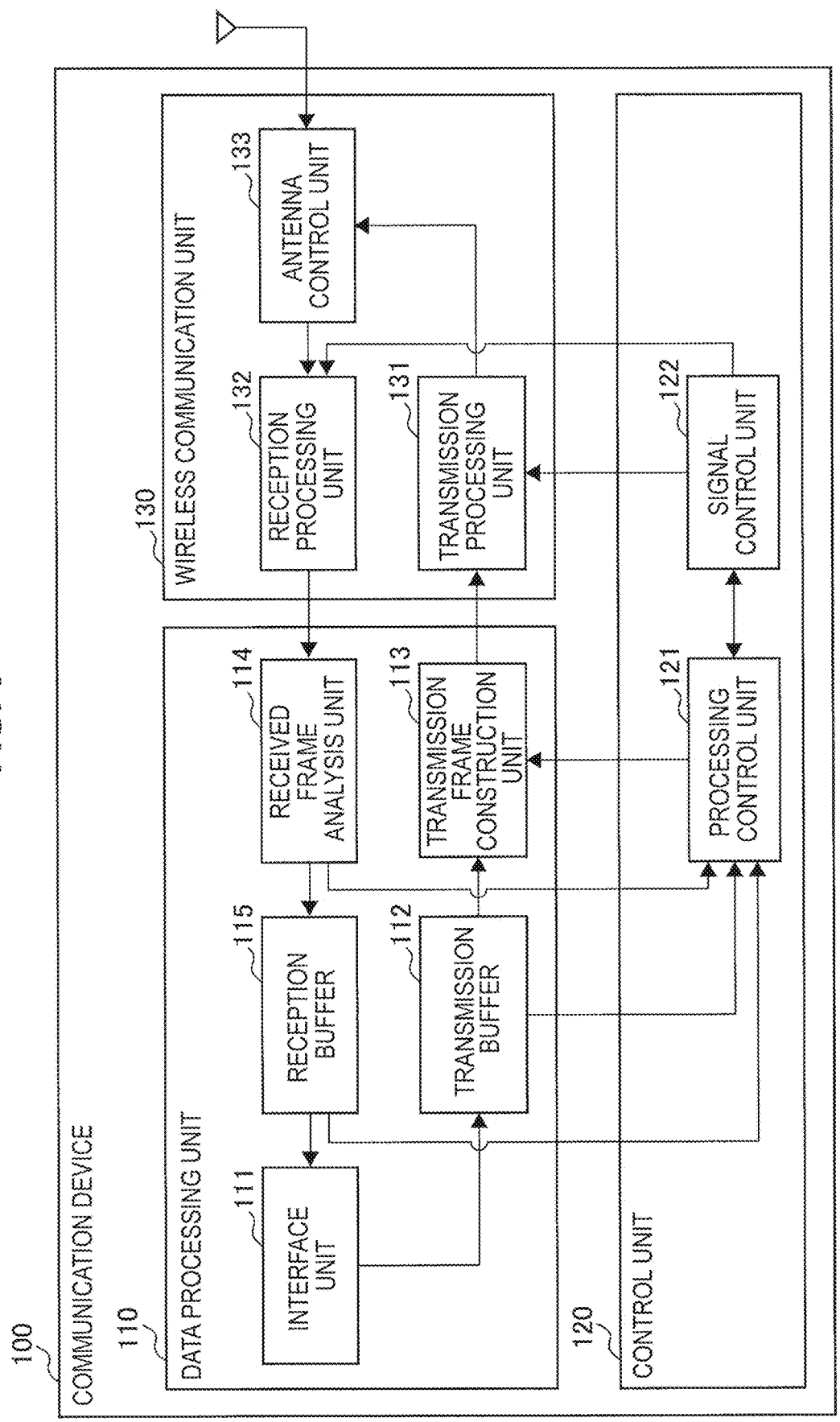
FIG. 6 is a block diagram illustrating an example of an overall functional configuration of a communication device according to an embodiment of the present disclosure.

First, a functional configuration of the communication device 100 according to the embodiment of the present disclosure will be described with reference to FIG. 6. FIG. 6 is a block diagram illustrating an example of an overall functional configuration of the communication device 100 according to the embodiment of the present disclosure.

As illustrated in FIG. 6, the communication device 100 includes a data processing unit 110, a control unit 120, and a wireless communication unit 130 as a communication unit. Moreover, the data processing unit 110, the control unit 120, and the wireless communication unit 130 are also collectively referred to as a communication unit below.

Data Processing Unit

As illustrated in FIG. 6, the data processing unit 110 includes an interface unit 111, a transmission buffer 112, a transmission frame construction unit 113, a received frame analysis unit 114, and a reception buffer 115.

The interface unit 111 is an interface connected to another functional configuration of the communication device 100. Specifically, the interface unit 111 executes the other functional configuration, for example, receives data desired to be transmitted from an application or supplies reception data to the application.

The transmission buffer 112 stores data to be transmitted. Specifically, the transmission buffer 112 stores data obtained by the interface unit 111.

The transmission frame construction unit 113 generates a frame to be transmitted. Specifically, the transmission frame construction unit 113 generates data to be stored in the transmission buffer 112 or generates a frame on the basis of control information set by the control unit 120. For example, the transmission frame construction unit 113 executes a process of generating a frame (or a packet) from data acquired from the transmission buffer 112 and executing, for example, addition of a media access control (MAC) header for MAC and addition of an error detection code to the generated frame.

The received frame analysis unit 114 analyzes a received frame. Specifically, the received frame analysis unit 114 determines a destination of a frame received by the wireless communication unit 130 and acquires data or control information included in the frame. For example, the received frame analysis unit 114 acquires data included in a received frame by executing, for example, analysis of a MAC header, detection and correction of a code error, and a reordering process on the received frame.

The reception buffer 115 stores received data. Specifically, the reception buffer 115 stores the data acquired by the received frame analysis unit 114.

Control Unit

As illustrated in FIG. 6, the control unit 120 includes a processing control unit 121 and a signal control unit 122.

The processing control unit 121 controls an operation of the data processing unit 110. Specifically, the processing control unit 121 controls occurrence of communication. For example, when a communication connection request occurs, the processing control unit 121 causes the data processing unit 110 to generate a frame related to a connection process or a certification process such as an association process or an authentication process.

In addition, the processing control unit 121 controls the generation of the frame on the basis of a data storage situation, a received-frame analysis result, or the like in the transmission buffer 112. For example, in a case in which data is stored in the transmission buffer 112, the processing control unit 121 instructs the transmission frame construction unit 113 to generate a data frame in which the data is stored. In addition, in a case in which the received frame analysis unit 114 confirms that a frame or a BA request frame is received, the processing control unit 121 instructs the transmission frame construction unit 113 to generate a confirmation response frame such as an ACK frame or a BA frame as a response to the received frame.

The signal control unit 122 controls an operation of the wireless communication unit 130. Specifically, the signal control unit 122 controls transmission and reception processes of the wireless communication unit 130. For example, the signal control unit 122 causes the wireless communication unit 130 to set parameters for transmission and reception on the basis of an instruction of the processing control unit 121.

Wireless Communication Unit

As illustrated in FIG. 6, the wireless communication unit 130 includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame supplied from the transmission frame construction unit 113. More specifically, the transmission processing unit 131 generates a signal related to a frame on the basis of a parameter set by an instruction from the signal control unit 122. For example, the transmission processing unit 131 generates a symbol stream by encoding, interleaving, and modulating a frame supplied from the data processing unit 110 in conformity with coding and modulation schemes or the like instructed by the control unit 120. In addition, the transmission processing unit 131 converts a signal related to the symbol stream obtained through a process on the front stage into an analog signal and executes amplification, filtering, and frequency up-conversion on the analog signal.

Moreover, the transmission processing unit 131 may execute a frame multiplexing process. Specifically, the transmission processing unit 131 executes a process related to time division multiplexing, frequency division multiplexing, code division multiplexing, orthogonal frequency division multiplexing, or space division multiplexing.

The reception processing unit 132 executes a frame reception process. Specifically, the reception processing unit 132 restores a frame on the basis of a signal supplied from the antenna control unit 133. For example, the reception processing unit 132 acquires a symbol stream by executing reverse processes to the processes at the time of transmission of the signal, for example, frequency down-conversion, digital signal conversion, and the like, on a signal obtained from the antenna. In addition, the reception processing unit 132 acquires a frame by demodulating and decoding the symbol stream obtained through the process on the front stage and supplies the acquired frame to the data processing unit 110 or the control unit 120.

Moreover, the reception processing unit 132 may execute a process related to demultiplexing of the multiplexed frame. Specifically, the reception processing unit 132 performs a process related to demultiplexing on a frame subjected to time division multiplexing, frequency division multiplexing, code division multiplexing, orthogonal frequency division multiplexing, or space division multiplexing.

In addition, the reception processing unit 132 may estimate a channel gain. Specifically, the reception processing unit 132 calculates complex channel gain information from a preamble portion or a training signal portion of a signal obtained from the antenna control unit 133. Moreover, the calculated complex channel gain information is used in the process related to frame multiplexing and a process of frame demultiplexing.

The antenna control unit 133 transmits and receives a signal via at least one antenna. Specifically, the antenna control unit 133 transmits a signal generated by the transmission processing unit 131 via the antenna and supplies a signal received via the antenna to the reception processing unit 132. In addition, the antenna control unit 133 may execute control related to space division multiplexing.

Moreover, although not illustrated in FIG. 6, the communication device 100 may include an input unit and an output unit connected via the interface unit 111. For example, the input unit acquires input information or the like of a user from an input device such as a keyboard or a mouse. Then, the input information or the like is stored as data in the transmission buffer via the interface unit 111. In addition, data stored in the reception buffer is supplied to the output unit via the interface unit 111 and the output unit outputs an image, audio, or the like on the basis of supplied data.

2-2. Technical Features

Next, technical features of the communication device 100 according to an embodiment of the present disclosure will be described. Hereinafter, a case in which the communication device 100 operates as a transmission side device and a case in which the communication device 100 operates as a reception side device will be separately described.

A. Operation as Transmission Side Device

First, the case in which the communication device 100 operates as the transmission side device will be described. Hereinafter, the communication device 100 operating as the transmission side device is referred to as a transmission side device 100T.

A-1. Start of BA Sequence

The transmission side device 100T requests a reception side device 100R to start a BA sequence. Specifically, the transmission side device 100T transmits a first frame including a request parameter and data for a block ACK and receives a second frame including a confirmation response to the data and a response parameter for the block ACK.

More specifically, the transmission side device 100T transmits the first frame on the basis of occurrence of a data transmission request. For example, on the basis of storing of data in the transmission buffer 112, the control unit 120 determines whether a data transmission request occurs. In a case in which it is determined that the data transmission request occurs, the control unit 120 causes the data processing unit 110 to generate a BA start frame (Block ACK Initiate Frame) as the first frame and the generated BA start frame is transmitted by the wireless communication unit 130. Further, the BA start frame will be described in detail with reference to FIG. 7. FIG. 7 is a diagram illustrating a configuration example of the BA start frame according to the embodiment.

As illustrated in FIG. 7, the BA start frame includes fields such as MAC Header, Block ACK Initiate Parameter, Data Payload, and Frame Check Sequence (FCS).

As illustrated in FIG. 7, the MAC header field includes fields such as Frame Control, Duration/ID, Address 1 to Address 3, Sequence Control, Address 4, QoS Control, and HT Control. Moreover, these fields are general fields of the MAC header, and therefore the description thereof will be omitted.

As illustrated in FIG. 7, the Block ACK Initiate Parameter field includes fields such as Block ACK Action, Dialog Token, and Block ACK Parameter Set, Block ACK Timeout Value, and Block ACK Starting Sequence Control which are request parameters for BA.

As illustrated in FIG. 7, the Block ACK Parameter Set field includes fields such as Aggregate MAC Service Data Unit (A-MSDU) Supported, Block ACK Policy, Traffic Identifier (TID), and Buffer Size as BA sequence parameters. In the A-MSDU Supported field, information indicating whether A-MSDU is supported is stored. In the Block ACK Policy field, BA policy information indicating a BA policy such as "Immediate" or "Delayed" is stored. In the TID field, an identifier for identifying Transmission Opportunity (TXOP) which is a BA target is stored. In the Buffer Size field, information indicating the number of MSDUs (or MAC Protocol Data Units (MPDUs)) (hereinafter also referred to as a buffer size) is stored.

In the Block ACK Timeout Value field, information indicating a timeout value in the BA sequence as information indicating a predetermined time related to end determination of the BA sequence is stored. Use of the timeout value will be described below.

The Block ACK Starting Control field includes fields such as Fragment Number and Starting Sequence Number. Moreover, in the Fragment Number field, information indicating the number of fragments is stored. In the Starting Sequence Number field, information indicating a starting sequence number of data related to the BA sequence is stored. Moreover, in a case in which a sequence number of the data stored in the Data Payload field is used as the start sequence number, the Starting Sequence Number field may be omitted and any parameter information may be stored in the field.

Moreover, the fields included in the foregoing BA start frame may be fields corresponding to the fields of the ADDBA request frame of the related art. In this case, it is possible to ensure compatibility of information in a process related to the BA sequence.

Figure 8:
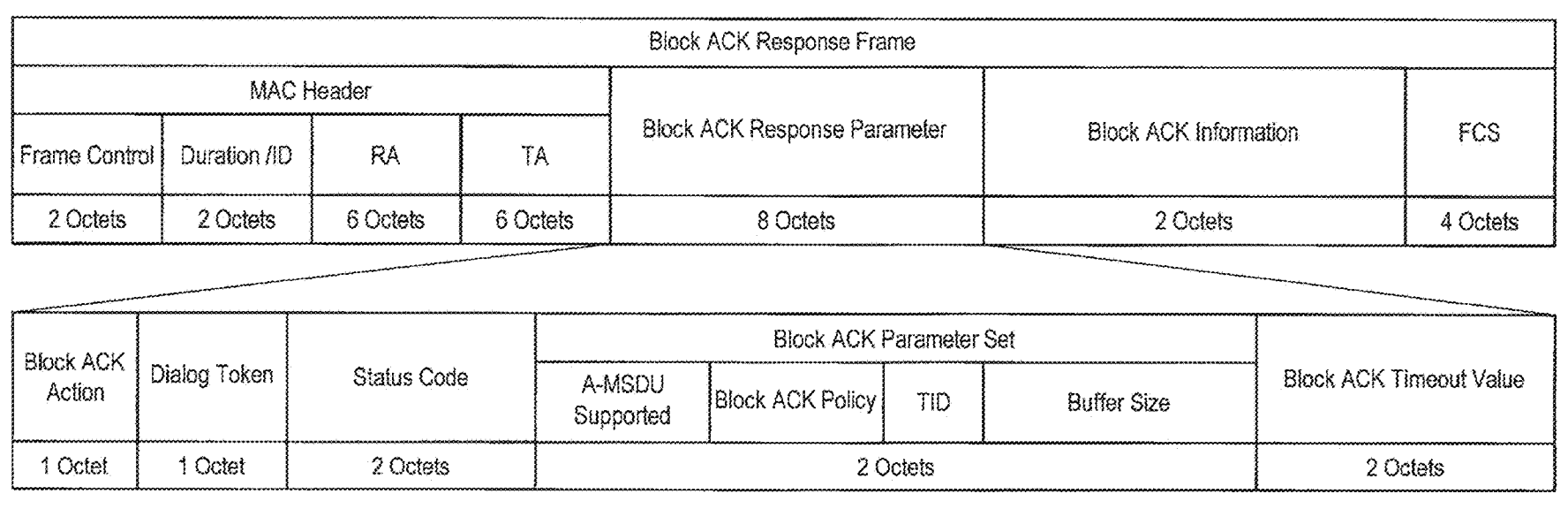

In addition, the transmission side device 100T receives the second frame as a response to the first frame. Specifically, the transmission side device 100T receives a BA response frame (Block ACK response Frame) which is the second frame as a response to the BA star frame. Further, the BA response frame will be described in detail with reference to FIG. 8. FIG. 8 is a diagram illustrating a configuration example of the BA response frame according to the embodiment.

As illustrated in FIG. 8, the BA frame includes fields such as MAC Header, Block ACK Response Parameter, Block ACK Information, and FCS.

As illustrated in FIG. 8, the MAC header field includes fields such as Frame Control, Duration/ID, Receiver Address (RA), and Transmitter Address (TA). Moreover, these fields are general fields of the MAC header, and therefore the description thereof will be omitted.

As illustrated in FIG. 8, the Block ACK Response Parameter field includes fields such as Block ACK Action, Dialog Token, Status Code, Block ACK Parameter Set which is a response parameter for BA, and Block ACK Timeout Value. In the Status Code field, information indicating an operation requested with the BA start frame, for example, information indicating success or failure of setting of a BA request parameter is stored.

As illustrated in FIG. 8, the Block ACK Parameter Set field includes fields such as A-MSDU Supported, Block ACK Policy, TID, and Buffer Size. Moreover, these fields are substantially the same as the fields with the same names described above, and therefore the description thereof will be omitted.

The Block ACK Information includes fields included in the above-described Block ACK Starting Sequence Control field, such as Fragment Number and Starting Sequence Number. Moreover, in the Block ACK information field, a field in which ACK information regarding data included in the BA start frame is stored may be installed.

Moreover, the example in which a frame format of the BA start frame is based on a frame format of the data frame and a frame format of the BA response frame is based on a frame format of a management frame has been described above, but the frame formats of the BA start frame and the BA response frame are not limited thereto. Various fields may be included in accordance with use. For example, in a case in which a plurality of pieces of data are stored in the Data Payload field of the BA start frame, information indicating successfully received data, for example, BA information such as a BA bitmap, may be stored in the Block ACK Information field or an additional field of the BA response frame.

A-2. Transmission of Data Frame

The transmission side device 100T transmits a data frame based on a response parameter for the BA included in the received second frame. Specifically, a plurality of pieces of data are transmitted with the data frame at one time.

More specifically, when the BA response frame is received, the transmission side device 100T sets the BA parameter of the self-device on the basis of the BA response parameter included in the BA response frame. Subsequently, the transmission side device 100T generates an aggregation data frame obtained by connecting the number of pieces of data specified on the basis of the set BA parameter. In addition, the transmission side device 100T sets an ACK policy in each piece of connected data. Then, the transmission side device 100T transmits the generated aggregation data frame to the reception side device 100R.

For example, when the BA response frame is received, the data processing unit 110 acquires the BA response parameter included in the BA response frame. The control unit 120 sets the BA response parameter acquired by the data processing unit 110 as the BA parameter of the self-device.

Subsequently, in a case in which data is stored in the transmission buffer 112, the control unit 120 specifies the number of pieces of connected data on the basis of a buffer size in the set BA parameter. The control unit 120 causes the data processing unit 110 to generate an aggregation data frame in accordance with the number of pieces of specified connected data. In addition, the control unit 120 sets the ACK policy in each piece of connected data and causes the data processing unit 110 to add information indicating the ACK policy to the aggregation data frame.

Then, the wireless communication unit 130 transmits the generated aggregation data frame to the reception side device 100R.

Moreover, the example in which the data frame is the aggregation data frame has been described above, but the data frame may be a data frame including one piece of data. In this case, the number of data frames corresponding to the number of pieces of connected data is continuously transmitted.

A-3. Reception of BA Frame

The transmission side device 100T receives the BA frame as a response to the data frame from the reception side device 100R. Specifically, when the BA frame is received, the transmission side device 100T determines whether there is unreached data. In a case in which the transmission side device 100T determines that there is the unreached data, the transmission side device 100T retransmit the data frame of the unreached data.

For example, when the BA frame is received, the data processing unit 110 acquires the BA information included in the BA frame. The control unit 120 determines whether there is unreached data from the BA information acquired by the data processing unit 110. In a case in which the control unit 120 determines that there is the unreached data, the control unit 120 causes the data processing unit 110 to generate the data frame of the unreached data. Moreover, in a case in which there are a plurality of pieces of unreached data, the plurality of pieces of unreached data are connected. Then, the wireless communication unit 130 transmits the generated data frames to the reception side device 100R.

A-4. End of BA Sequence

The transmission side device 100T ends the BA sequence without performing the DELBA process of the related art. Specifically, in a case in which the transmission of the data frame based on the response parameter is not executed for a predetermined time, the transmission side device 100T ends the transmission of the data frame based on the response parameter.

For example, the control unit 120 determines whether a time indicated by a timeout value in the BA sequence has passed from the transmission of the recent data frame based on the BA parameter set at the time of starting of the BA sequence. In a case in which the control unit 120 determines that the predetermined time has passed from the transmission of the recent data frame, the control unit 120 initializes the set BA parameter or does not use the BA parameter later. In addition, the control unit 120 may initialize the BA parameter and open resources ensured for the BA sequence.

Moreover, of course, the DELBA process of the related art may be executed to end the BA sequence. In this case, the transmission side device 100T transmits a DELBA Request frame to the reception side device 100R. When an ACK frame is received as a response to the DELBA Request frame, the BA sequence ends.

B. Operation as Reception Side Device

Next, a case in which the communication device 100 operates as a reception side device will be described. Hereinafter, the communication device 100 operating as the transmission side device is referred to as a reception side device 100R.

B-1. Start of BA Sequence

The reception side device 100R responds to a request for starting the BA sequence from the transmission side device 100T. Specifically, the reception side device 100R receives the first frame including the request parameter and the data for the block ACK and transmits the second frame including the confirmation response for the response parameter and the data for the block ACK.

More specifically, the reception side device 100R sets the BA parameter of the self-device on the basis of the BA request parameter included in the received BA start frame. For example, when the BA start frame is received, the data processing unit 110 acquires the BA request parameter included in the BA start frame. The control unit 120 determines whether the request parameter acquired by the data processing unit 110 can be set as the BA parameter of the self-device. In a case in which the control unit 120 determines that the BA request parameter can be set, the control unit 120 sets the BA parameter as the BA request parameter. Moreover, the BA parameter set on the basis of the BA request parameter may be a partial parameter.

In addition, the reception side device 100R acquires the data included in the received BA start frame. For example, the data processing unit 110 acquires the data included in the BA start frame. The acquired data is stored in the reception buffer 115.

Moreover, in a case in which the start sequence number is not included as the BA request parameter, the control unit 120 sets a sequence number of the data included in the BA start frame as a start sequence number of the block ACK. For example, the control unit 120 determines whether the start sequence number is included in the BA request parameter. In a case in which the control unit 120 determines that the start sequence number is not included, the control unit 120 sets the sequence number of the data acquired from the BA start frame as a start sequence number related to the BA sequence.

Then, the reception side device 100R transmits a BA response frame as a response to the BA start frame to the transmission side device 100T. For example, the control unit 120 causes the data processing unit 110 to generate a BA response frame including the BA parameter of the self-device as the BA response parameter. In addition, the control unit 120 causes the data processing unit 110 to include ACK information regarding the data included in the BA start frame in the BA response frame. Then, the wireless communication unit 130 transmits the generated BA response frame to the transmission side device 100T.

B-2. Reception of Data Frame

The reception side device 100R receives the data frame from the transmission side device 100T. Specifically, when the aggregation data frame is received, the data processing unit 110 acquires each piece of data from the aggregation data frame. In addition, the data processing unit 110 acquires the information indicating the ACK policy included in the aggregation data frame.

B-3. Transmission of BA Frame

The reception side device 100R transmits the BA frame as a response to the received data frame to the transmission side device 100T. Specifically, the reception side device 100R executes transmission of the BA frame based on the BA response parameter as the response to the data frame received after transmitting the BA response frame.

For example, the control unit 120 specifies data for which return of ACK is requested from the information indicating the ACK policy included in the aggregation data frame.

Subsequently, the control unit 120 generates the BA information of the specified data and causes the data processing unit 110 to generate the BA frame including the generated BA information. Then, the wireless communication unit 130 transmits the generated BA frame to the transmission side device 100T.

B-4. End of BA Sequence

Even in a case in which the DELBA process of the related art is not executed, the reception side device 100R ends the BA sequence. Specifically, in a case in which the data frame is not received for a predetermined period, the reception side device 100R ends the transmission of the block ACK based on the response parameter.

For example, the control unit 120 determines whether a time indicated by a timeout value in the BA sequence has passed from the reception of the recent data frame based on the BA parameter set at the time of starting of the BA sequence. In a case in which the control unit 120 determines that the predetermined time has passed from the reception of the recent data frame, the control unit 120 initializes the set BA parameter or does not use the BA parameter later. In addition, the control unit 120 may initialize the BA parameter and open resources ensured for the BA sequence.

Moreover, the DELBA process of the related art may be executed to end the BA sequence. In this case, the reception side device 100R receives a DELBA Request frame from the transmission side device 100T and transmits the ACK frame as a response to the DELBA Request frame. After the ACK frame is transmitted, the BA sequence ends.

2-3. Process of Communication Device

Next, a process of the communication device 100 according to the embodiment will be described.

Overview of Process

Figure 9:
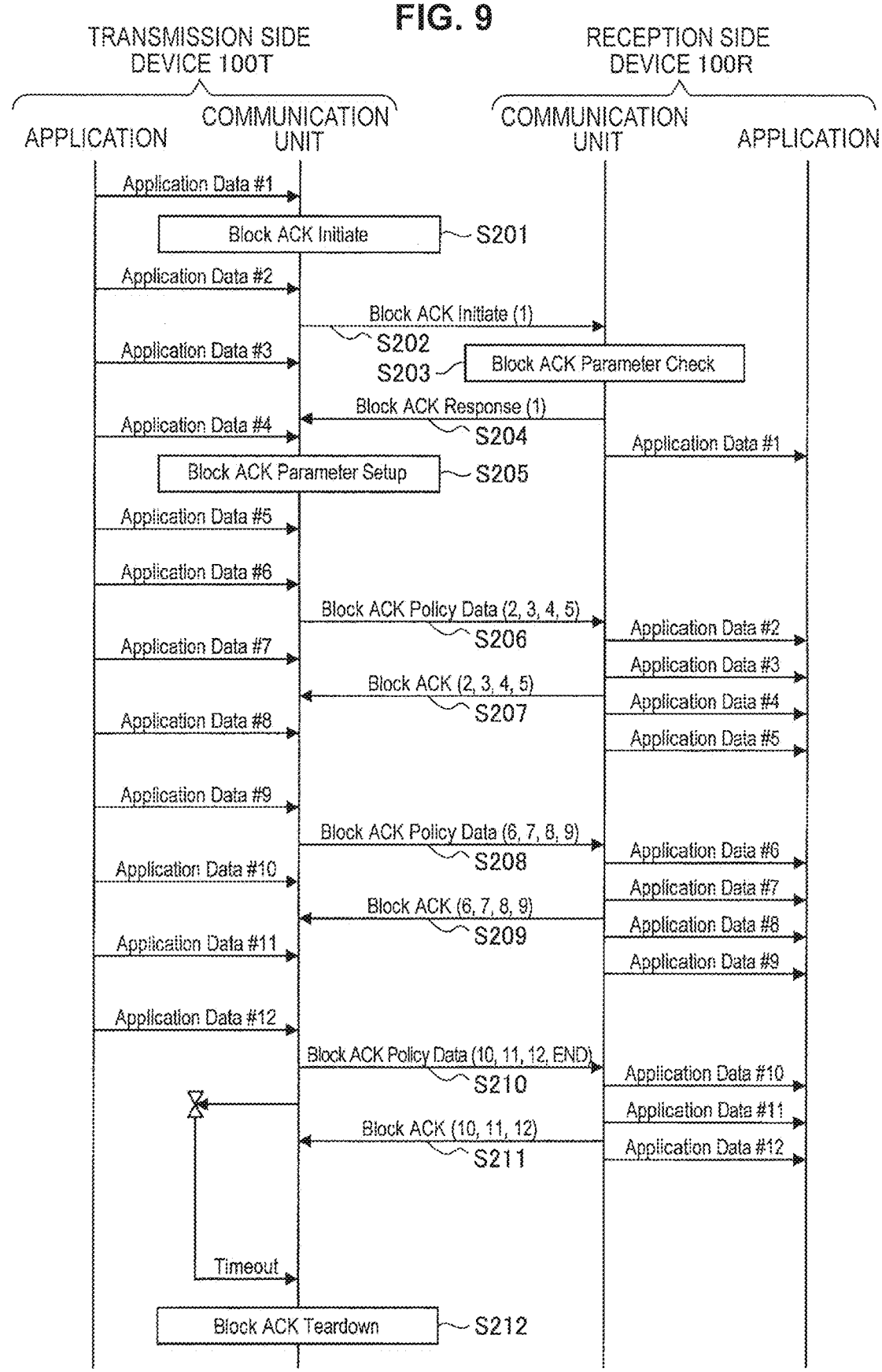
FIG. 9 is a sequence diagram illustrating a process related to a BA sequence of a communication device according to the embodiment.

First, an overview of the process of the communication device 100 will be described with reference to FIG. 9. FIG. 9 is a sequence diagram illustrating a process related to the BA sequence of the communication device 100 according to the embodiment.

The transmission side device 100T generates a BA start frame when a data transmission request occurs (step S201). Specifically, when application data #1 is stored in the transmission buffer 112 from the application of the transmission side device 100T, the communication unit generates a Block ACK Initiate frame including the BA request parameter and application data #1.

Subsequently, the transmission side device 100T transmits the generated BA start frame to the reception side device 100R (step S202). Specifically, the communication unit transmits the generated Block ACK Initiate frame to the reception side device 100R.

The reception side device 100R receiving the BA start frame sets the BA parameter (step S203). Specifically, when the Block ACK Initiate frame is received, the communication unit of the reception side device 100R acquires the BA request parameter included in the Block ACK Initiate frame and sets the BA parameter of the self-device on the basis of the BA request parameter. In addition, the communication unit acquires application data #1 included in the Block ACK Initiate frame and supplies the acquired application data #1 to the application.

Subsequently, the reception side device 100R transmits the BA response frame to the transmission side device 100T (step S204). Specifically, the communication unit sets the BA parameter, subsequently generates the Block ACK Response frame including the set BA parameter as a BA response parameter, and transmits the generated Block ACK Response frame to the transmission side device 100T.

The transmission side device 100T receiving the BA response frame sets the BA parameter (step S205). Specifically, when the BA response frame is received, the communication unit sets the BA parameter of the self-device on the basis of the BA response parameter included in the BA response frame.

Subsequently, the transmission side device 100T transmits the data frame including the number of pieces of data specified with the BA parameter to the reception side device 100R (steps S206 and S208). Specifically, the communication unit generates an aggregation data frame by connecting the number of pieces of data specified with the BA parameter in the data stored by the application, for example, four pieces of data, application data #2 to application data #5 (application data #6 to application data #9). Then, the communication unit transmits the generated aggregation data frame to the reception side device 100R.

The reception side device 100R receiving the data frame transmits the BA frame as a response to the data frame (step S207 and S209). Specifically, when the aggregation data frame is received, the communication unit acquires application data #2 to application data #5 included in the aggregation data frame. Then, the communication unit generates the BA information regarding the acquired application data #2 to application data #5 (application data #6 to application data #9) and transmits the BA frame including the generated BA information to the transmission side device 100T. Moreover, the acquired application data #2 to application data #5 (application data #6 to application data #9) are supplied to the application.

Subsequently, the transmission side device 100T transmits the data fame including the number of pieces of data less than a number specified with the BA parameter (step S210). Specifically, in a case in which only the number of pieces of data less than a number (for example, 4) specified with the BA parameter is stored in the transmission buffer 112, the communication unit generates the aggregation data frame using only three pieces of data, the stored application data #10 to application data #12. Then, the communication unit transmits the generated aggregation data frame to the reception side device 100R. Moreover, the generation of the data frame and determination of the transmission may be executed on the basis of information indicating end of continuity of the data stored in the transmission buffer 112 or may be executed on the basis of a time elapsed from the storing recent data.

The reception side device 100R receiving the data frame transmits the BA frame as a response to the data frame (step S211). The process of the step is substantially the same as steps S207 and S209, and therefore the description thereof will be omitted.

The transmission side device 100T receiving the BA frame ends the BA sequence when timeout occurs in the BA sequence (step S212). Specifically, the communication unit initializes the BA parameter when a time indicated by the timeout value of the BA parameter has passed from the transmission of the recent data frame (the data frame including application data #10 to application data #12). Moreover, the reception side device 100R may also execute the process of ending the BA sequence.

BA Sequence Start Process of Transmission Side Device

Figure 10:
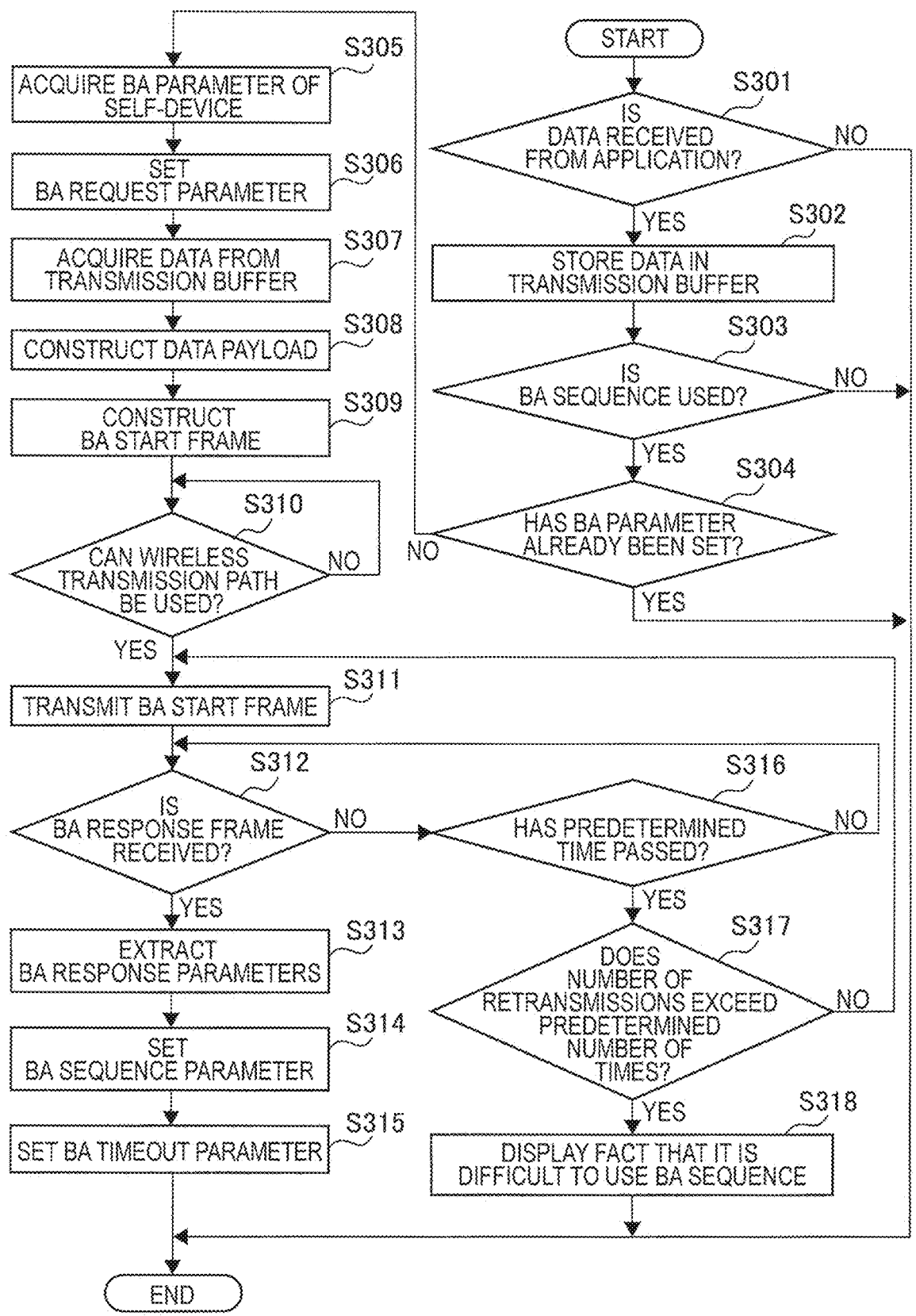
FIG. 10 is a flowchart conceptually illustrating a BA sequence start process in a transmission side device according to the embodiment.

Next, a BA sequence start process in the transmission side device 100T will be described with reference to FIG. 10. FIG. 10 is a flowchart conceptually illustrating the BA sequence start process in the transmission side device 10T according to the embodiment.

The transmission side device 100T determines whether data is received from the application (step S301). Specifically, the interface unit 111 determines whether data desired to be transmitted is received from the application.

When the transmission side device 100T determines that the data is received from the application, the transmission side device 100T stores the received data in the transmission buffer 112 (step S302). Specifically, when the data is received from the application, the interface unit 111 stores the received data in the transmission buffer 112.

Subsequently, the transmission side device 100T determines whether the BA sequence is used (step S303). Specifically, on the basis of capability information or the like, the control unit 120 determines whether both the self-device and the reception side device 100R can execute data communication using the BA.

When the transmission side device 100T determines that the BA sequence is used, the transmission side device 100T determines whether the BA parameter is set (step S304). Specifically, when it is determined that the data communication can be executed using the BA, the control unit 120 determines whether the BA parameter has already been set.

When it is determined that the BA parameter has not yet been set, the transmission side device 100T acquires the BA parameter of the self-device (step S305). Specifically, when it is determined that the BA parameter has not yet been set, the control unit 120 acquires, for example, the BA parameter of the self-device, such as a bufferable data amount or an allowable delay time, from a storage unit separately included in the transmission side device 100T. Moreover, a process of deciding the BA parameter may be executed in the step.

Subsequently, the transmission side device 100T sets the BA request parameter (step S306). Specifically, the control unit 120 sets the BA request parameter on the basis of the acquired BA parameter. Moreover, content of the BA request parameter may be substantially the same as a parameter included in the ADDBA request frame of the related art.

Subsequently, the transmission side device 100T acquires data from the transmission buffer 112 (step S307). Specifically, the data processing unit 110 acquires the data included in the BA start frame from the transmission buffer 112 on the basis of an instruction of the control unit 120.

Subsequently, the transmission side device 100T constructs a data payload (step S308). Specifically, the data processing unit 110 constructs the data payload of the BA start frame using the acquired data. Moreover, in a case in which a plurality of pieces of data are acquired, data is connected (aggregated) and the connected data is stored in the data payload.

Subsequently, the transmission side device 100T constructs the BA start frame (step S309). Specifically, the data processing unit 110 constructs the BA start frame including the set BA request parameter and the constructed data payload.

Subsequently, the transmission side device 100T determines whether a wireless transmission path can be used (step S310). Specifically, the control unit 120 determines whether the wireless transmission path is vacant by using carrier sensing or the like.

When the transmission side device 100T determines that the wireless transmission path can be used, the transmission side device 100T transmits the BA start frame (step S311). Specifically, when it is determined that the wireless transmission path is vacant, the control unit 120 causes the wireless communication unit 130 to transmit the constructed BA start frame.

Subsequently, the transmission side device 100T waits until the BA response frame is received (step S312). Specifically, the wireless communication unit 130 waits for the BA response frame after transmitting the BA start frame.

When the BA response frame is received, the transmission side device 100T extracts the BA response parameter (step S313). Specifically, when the BA response frame is received, the data processing unit 110 acquires the BA response parameters included in the BA response frame.

Subsequently, the transmission side device 100T sets the BA sequence parameter (step S314). Specifically, the control unit 120 sets the BA sequence parameter as the BA parameter of the self-device with respect to the reception side device among the BA response parameters acquired by the data processing unit 110.

Subsequently, the transmission side device 100T sets a BA timeout parameter (step S315). Specifically, the control unit 120 sets the BA timeout parameter as a timeout value in the BA sequence of the self-device with respect to the reception side device among the BA response parameters acquired by the data processing unit 110.

In addition, the transmission side device 100T determines whether a predetermined time has passed from the transmission of the BA start frame with the BA response frame remaining unreceived in step S312 (step S316). Specifically, the control unit 120 determines whether the predetermined time has passed from the transmission of the BA start frame with the BA response frame unreceived.

When the transmission side device 100T determines that the predetermined time has passed from the transmission of the BA start frame, the transmission side device 100T determines whether the number of retransmissions exceeds a predetermined number of times (step S317). Specifically, when it is determined that the predetermined time has passed from the transmission of the BA start frame, the control unit 120 determines whether the number of retransmissions of the BA start frame exceeds the predetermined number of times.

When the transmission side device 100T determines that the number of retransmissions exceeds the predetermined number of times, the transmission side device 100T displays the fact that it is difficult to use the BA sequence (step S318). Specifically, when it is determined that the number of retransmissions of the BA start frame exceeds the predetermined number of times, the control unit 120 causes the output unit to output an image indicating the fact that it is difficult to use the BA sequence. Of course, output content may be audio. Moreover, in a case in which it is determined that the number of retransmission does not exceed the predetermined number of times, the transmission side device 100T retransmits the BA start frame.

Data Frame Transmission Process of Transmission Side Device

Figure 11:
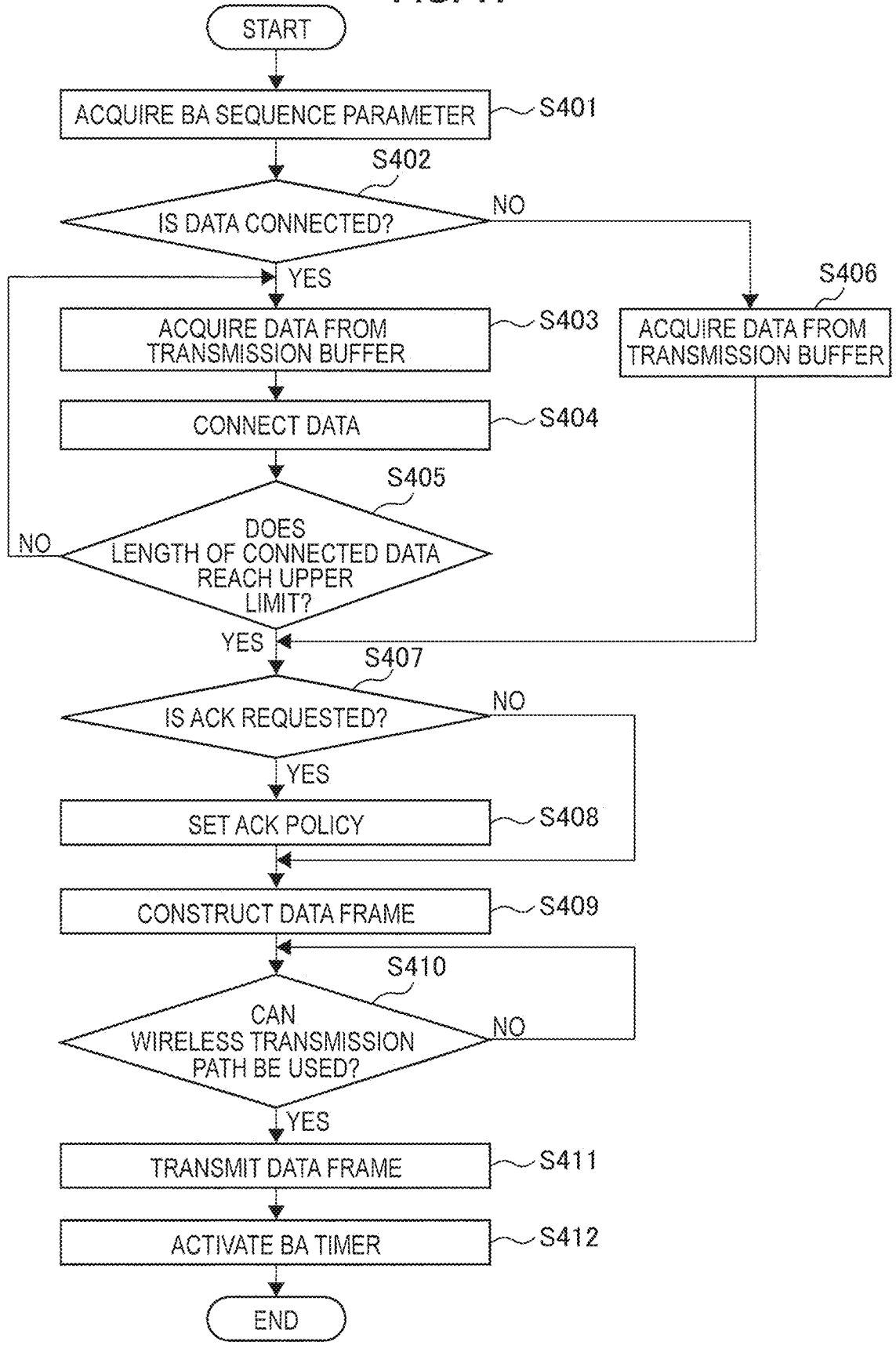
FIG. 11 is a flowchart conceptually illustrating a data frame transmission process in the transmission side device according to the embodiment.

Next, a data frame transmission process in the transmission side device 100T will be described with reference to FIG. 11. FIG. 11 is a flowchart conceptually illustrating the data frame transmission process in the transmission side device 100T according to the embodiment. Moreover, the description of substantially the same process as the above-described process will be omitted.

The transmission side device 100T acquires the BA sequence parameter (step S401). Specifically, the control unit 120 acquires the set BA sequence parameter of the self-device.

Subsequently, the transmission side device 100T determines whether the data is connected (step S402). Specifically, on the basis of the setting information regarding aggregation, the control unit 120 determines whether data aggregation is used.

When the transmission side device 100T determines that the data is connected, the transmission side device 100T acquires the data from the transmission buffer 112 (step S403). Specifically, when it is determined that the data aggregation is used, the control unit 120 causes the data processing unit 110 to acquire the data from the transmission buffer 112.

Subsequently, the transmission side device 100T connects the acquired data (step S404). Specifically, the data processing unit 110 assigns delimiters, paddings, and the like to the acquired data to connect the data.

Subsequently, the transmission side device 100T determines whether the length of the connected data reaches an upper limit and there is data to be connected (step S405). Specifically, the data processing unit 110 determines whether the size of the connected data reaches the upper limit of the aggregation and there is no data in the transmission buffer 112.

Moreover, when it is determined that the length of the connected data does not exceed the upper limit and there is data in the transmission buffer 112, the process returns to step S403.

In addition, in a case in which it is determined in step S402 that the data is not connected, the transmission side device 100T acquires the data from the transmission buffer 112 (step S406).

In a case in which it is determined in step S405 that the length of the connected data exceeds the upper limit or the process of step S406 passes, the transmission side device 100T determines whether an ACK is requested (step S407). Specifically, the control unit 120 determines whether the reception side device 100R is requested to return the ACK.

When it is determined that the ACK is requested, the transmission side device 100T sets the ACK policy (step S408). Specifically, when it is determined that the ACK is requested to be returned, the control unit 120 sets the ACK policy in which the ACK is returned.

Subsequently, the transmission side device 100T constructs a data frame (step S409). Specifically, the control unit 120 constructs a PHY burst by generating a header that includes information indicating the ACK policy, for example, a PLCP header and a MAC header, and adding the connected data to the generated header.

Subsequently, the transmission side device 100T determines whether a wireless transmission path can be used (step S410).

When the transmission side device 100T determines that the wireless transmission path can be used, the transmission side device 100T transmits the data frame (step S411). Specifically, when it is determined that the wireless transmission path is vacant, the control unit 120 transmits the constructed PHY burst, that is, the data frame, to the reception side device 100R.

Subsequently, the transmission side device 100T activates a BA timer (step S412). Specifically, the control unit 120 activates the BA timer to determine timeout in the BA sequence after the transmission of the data frame.

BA Frame Reception Process of Transmission Side Device

Figure 12:
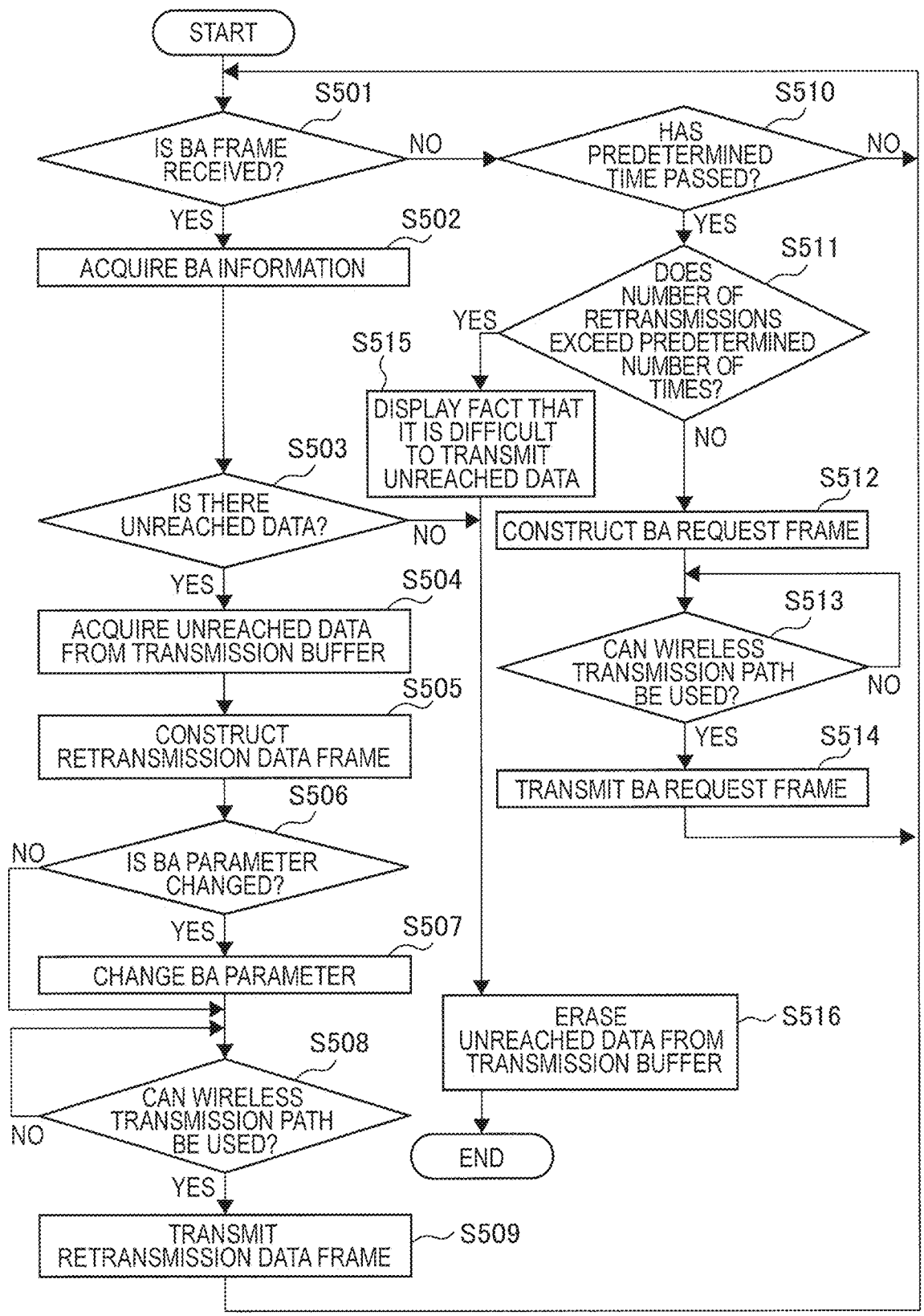
FIG. 12 is a flowchart conceptually illustrating a BA frame reception process in the transmission side device according to the embodiment.

Next, a BA frame reception process in the transmission side device 100T will be described with reference to FIG. 12. FIG. 12 is a flowchart conceptually illustrating the BA frame reception process in the transmission side device 100T according to the embodiment. Moreover, the description of substantially the same process as the above-described process will be omitted.

The transmission side device 100T waits until the BA frame is received (step S501). Specifically, the wireless communication unit 130 waits for reception of the BA frame after transmitting a data frame or a BA request frame to be described below.

When the BA frame is received, the transmission side device 100T acquires the BA information (step S502). Specifically, when the BA frame is received, the data processing unit 110 acquires the BA information included in the BA frame.

Subsequently, the transmission side device 100T determines whether there is unreached data (step S503). Specifically, on the basis of the BA information acquired by the data processing unit 110, the control unit 120 determines whether there is the unreached data.

When the transmission side device 100T determines that there is the unreached data, the transmission side device 100T acquires the unreached data from the transmission buffer 112 (step S504). Specifically, the control unit 120 specifies the unreached data on the basis of the BA information and causes the data processing unit 110 to acquire the specified data from the transmission buffer 112. Moreover, in a case in which there are the plurality of pieces of unreached data, the plurality of pieces of data are acquired.

Subsequently, the transmission side device 100T constructs a retransmission data frame (step S505). Specifically, the data processing unit 110 constructs the retransmission data frame including the acquired data. Moreover, in a case in which the plurality of pieces of data are acquired, the connected data can be included in the retransmission data frame.

Subsequently, the transmission side device 100T determines whether the BA parameter is changed (step S506). Specifically, on the basis of a data retransmission situation or the like, the control unit 120 determines whether the BA parameter is changed. For example, in a case in which retransmission of the data continues, the control unit 120 determines whether the BA parameter, for example, a buffer size, is changed.

When it is determined that the BA parameter is changed, the transmission side device 100T changes the BA parameter (step S507). Specifically, when it is determined that the BA parameter is changed, the control unit 120 changes the set BA parameter of the self-device. For example, in a case in which the retransmission of the data continues, the control unit 120 reduces the buffer size by the number of pieces of data (MSDU or MPDU) to be retransmitted.

Subsequently, the transmission side device 100T determines whether the wireless communication path can be used (step S508).

When the transmission side device 100T determines that the wireless transmission path can be used, the transmission side device 100T transmits the retransmission data frame (step S509). Specifically, when it is determined that the wireless transmission path is vacant, the control unit 120 causes the wireless communication unit 130 to transmit the constructed retransmission data frame.

In addition, the transmission side device 100T determines whether a predetermined time has passed with the BA frame unreceived in step S501 from the transmission of the frame (step S510). Specifically, the control unit 120 determines whether the predetermined time has passed from the transmission of the data frame or the BA request frame to be described with the BA frame unreceived.

When it is determined that the predetermined time has passed from the transmission of the frame, the transmission side device 100T determines whether the number of retransmissions of the frame exceeds a predetermined number of times (step S511). Specifically, when it is determined that the predetermined time has passed from the transmission of the data frame or the BA request frame, the control unit 120 determines that the number of retransmissions of the BA request frame exceeds a predetermined number of times.

Subsequently, when it is determined that the number of retransmissions does not exceed the predetermined number of times, the transmission side device 100T constructs the BA request frame (step S512). Specifically, when it is determined that the number of retransmissions of the BA request frame does not exceed the predetermined number of times, the control unit 120 causes the data processing unit 110 to construct the BA request frame (Block ACK Request Frame).

Subsequently, the transmission side device 100T determines whether the wireless transmission path can be used (step S513).

When the transmission side device 100T determines that the wireless transmission path can be used, the transmission side device 100T transmits the BA request frame (step S514). Specifically, when it is determined that the wireless transmission path is vacant, the control unit 120 causes the wireless communication unit 130 to transmit the constructed BA request frame. Moreover, instead of the BA request frame, the data frame may be retransmitted.

Moreover, when it is determined in step S511 that the number of retransmissions exceeds the predetermined number of times, the transmission side device 100T displays the fact that it is difficult to transmit the unreached data (step S515). Specifically, when it is determined that the number of retransmissions of the BA request frame exceeds the predetermined number of times, the control unit 120 causes the output unit to output an image indicating the fact that it is difficult to transmit the unreached data to the reception side device 100R.

Conversely, in a case in which it is determined in step S503 that there is no unreached data or the process of step S515 passes, the transmission side device 100T erases the unreached data from the transmission buffer 112 (step S516). Specifically, in a case in which it is determined that there is no unreached data, the control unit 120 erases the data transmitted from the transmission buffer 112 since the data included in the data frame is all transmitted. In addition, since the number of retransmissions of the BA request frame reaches the upper limit and the transmission of the unreached data is stopped, the control unit 120 erases the unreached data from the transmission buffer 112.

BA Sequence Start Process of Reception Side Device

Figure 13:
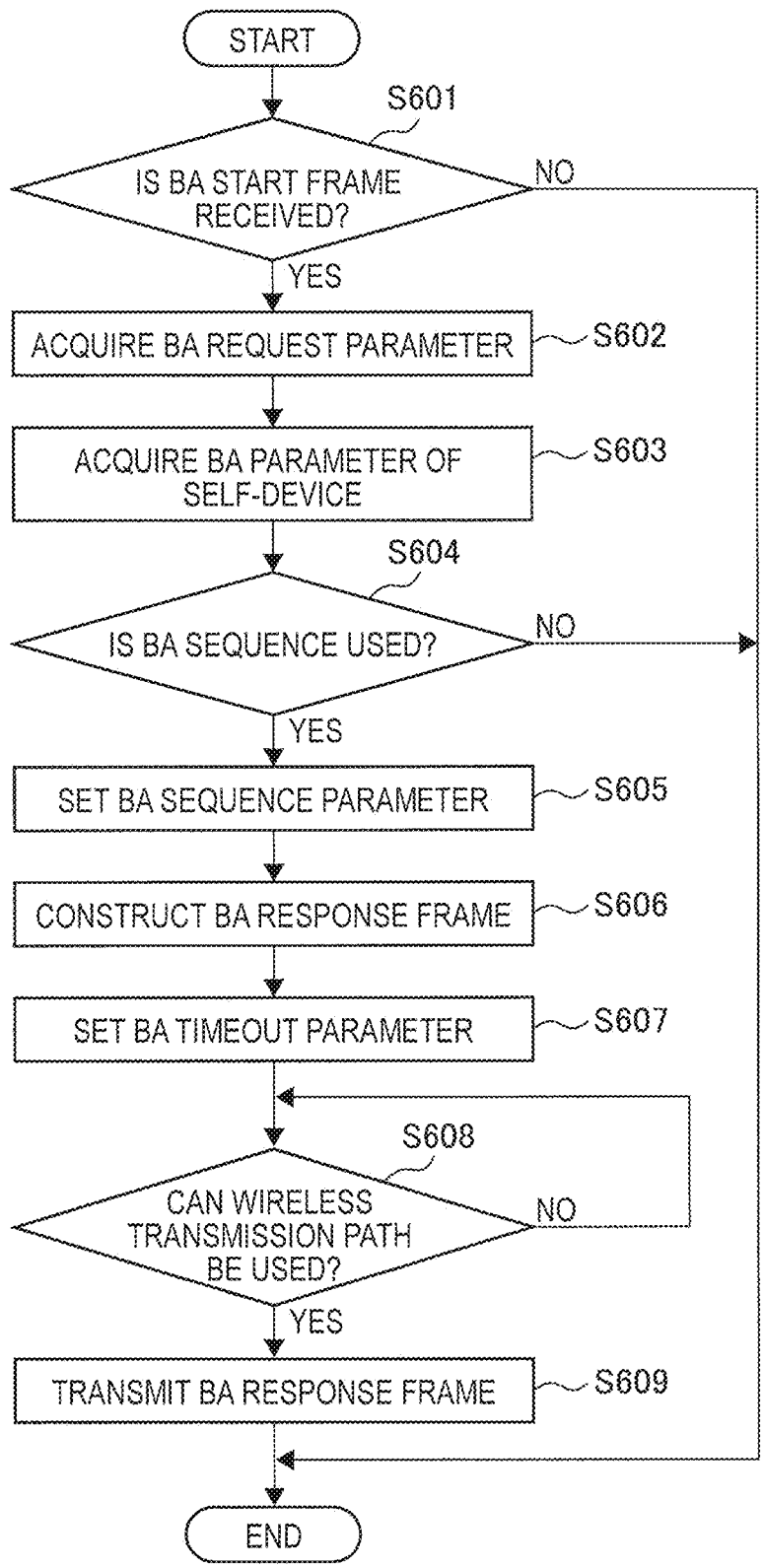
FIG. 13 is a flowchart conceptually illustrating a BA sequence start process in a reception side device according to the embodiment.

Next, a BA sequence start process in the reception side device 100R will be described with reference to FIG. 13. FIG. 13 is a flowchart conceptually illustrating the BA sequence start process in the reception side device 100R according to the embodiment. Moreover, the description of substantially the same process as the above-described process will be omitted.

The reception side device 100R waits for reception of the BA start frame (step S601). Specifically, the wireless communication unit 130 waits for the BA start frame as a communication parameter with which at least the BA start frame can be received.

When the BA start frame is received, the reception side device 100R acquires the BA request parameter (step S602). Specifically, when the BA start frame is received, the data processing unit 110 acquires the BA request parameter included in the BA start frame.

Subsequently, the reception side device 100R acquires the BA parameter of the self-device (step S603). Specifically, when the BA start frame is received, the control unit 120 acquires the BA parameter of the self-device from the storage unit.

Subsequently, the reception side device 100R determines whether the BA sequence is used (step S604). Specifically, on the basis of capability information or the like, the control unit 120 determines whether the self-device can execute data communication using the BA.

When it is determined that the BA sequence is used, the reception side device 100R sets the BA sequence parameter (step S605). Specifically, when it is determined that the data communication can be executed using the BA, the control unit 120 sets the BA request parameter as the BA parameter of the self-device for the transmission side device within a range settable in the self-device. Moreover, in a case in which the BA request parameter is out of the range settable in the self-device, the acquired BA parameter is set as the BA parameter of the self-device for the transmission side device. Moreover, some of the BA parameters may be set as the BA request parameter.

Subsequently, the reception side device 100R constructs the BA response frame (step S606). Specifically, the control unit 120 causes the data processing unit 110 to construct the BA response frame.

Subsequently, the reception side device 100R sets the BA timeout parameter (step S607). Specifically, the control unit 120 sets the timeout value in the BA sequence and the set value is included in the BA response frame.

Subsequently, the reception side device 100R determines whether the wireless transmission path can be used (step S608).

When it is determined that the wireless transmission path can be used, the reception side device 100R transmits the BA response frame (step S609). Specifically, when it is determined that the wireless transmission path is vacant, the control unit 120 causes the wireless communication unit 130 to transmit the BA response frame.

BA Frame Transmission Process of Reception Side Device

Figure 14:
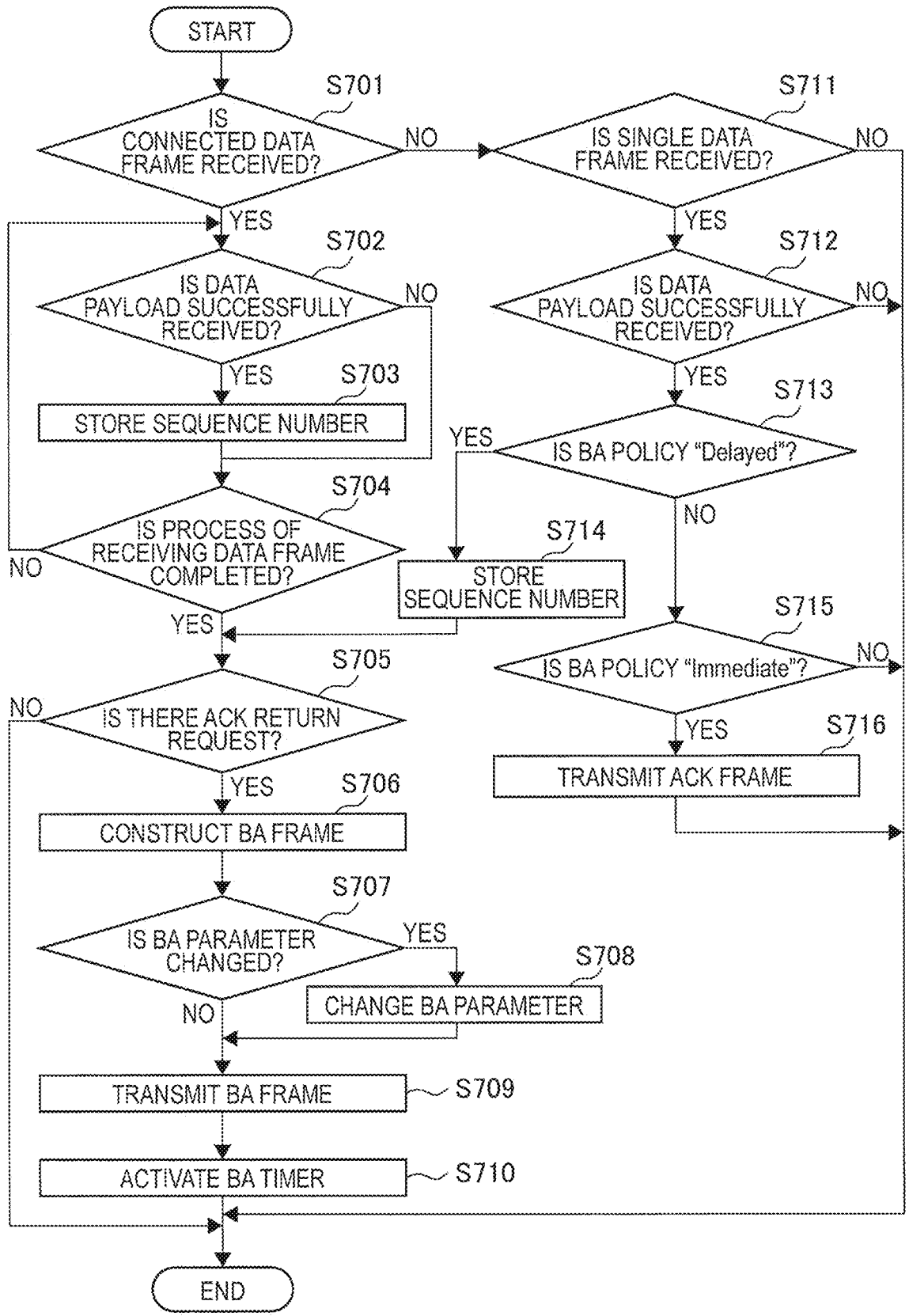
FIG. 14 is a flowchart conceptually illustrating a BA frame transmission process in the reception side device according to the embodiment.

Next, a BA frame transmission process in the reception side device 100R will be described with reference to FIG. 14. FIG. 14 is a flowchart conceptually illustrating a BA frame transmission process in the reception side device 100R according to the embodiment. Moreover, the description of substantially the same process as the above-described process will be omitted.

The reception side device 100R determines whether the connected (aggregated) data frame is received (step S701). Specifically, when the data frame is received, the data processing unit 110 determines whether the data frame is an aggregation data frame.

When the reception side device 100R determines that the connected data frame is received, the reception side device 100R determines whether the data payload is successfully received (step S702). Specifically, when it is determined that the received frame is the aggregation data frame, the data processing unit 110 determines whether the data payload of the frame is successfully received.

When it is determined that the data payload is successfully received, the reception side device 100R stores a sequence number (step S703). Specifically, when it is determined that the data payload of the received frame is successfully received, the data processing unit 110 acquires the sequence number of the data included in the data payload. Then, the control unit 120 causes the storage unit to store the acquired sequence number.

Subsequently, the reception side device 100R determines whether the process of receiving the data frame is completed (step S704). Specifically, the data processing unit 110 determines that the process of receiving the aggregation data frame is completed. Moreover, in a case in which the reception process is not completed, the process returns to step S702 and the process of receiving a subsequent data payload is executed.

When it is determined that the process of receiving the data frame is completed, the reception side device 100R determines whether there is an ACK return request (step S705). Specifically, when the process of receiving the data frame is completed, the control unit 120 determines whether there is the ACK return request on the basis of the ACK policy included in the data frame.

When it is determined that the ACK return request is made, the reception side device 100R constructs the BA frame (step S706). Specifically, in a case in which the ACK return request is made, the control unit 120 constructs the BA frame which is a response to the data frame.

Subsequently, the reception side device 100R determines whether the BA parameter is changed (step S707). Specifically, on the basis of a situation or the like of the reception buffer 115 of the self-device, the control unit 120 determines whether the BA parameter is changed. For example, in a case in which an amount of the reception buffer 115 usable in the BA sequence is changed, the control unit 120 determines that the BA parameter, for example, a buffer size or an allowable delay time, is changed.

When it is determined that the BA parameter is changed, the reception side device 100R changes the BA parameter (step S708). Specifically, when it is determined that the BA parameter is changed, the control unit 120 changes the set BA parameter of the self-device. For example, in a case in which the amount of the reception buffer 115 usable for the BA sequence decreases, the control unit 120 changes the buffer size or the allowable delay time to the decreased data amount (the number of MSDUs or MPDUs) usable in the reception buffer 115.

Subsequently, the reception side device 100R transmits the BA frame (step S709). Specifically, the control unit 120 determines whether the wireless transmission path can be used. In a case in which it is determined that the wireless transmission path is vacant, the BA frame is transmitted to the transmission side device 100T.

Subsequently, the reception side device 100R activates the BA timer (step S710). Specifically, the control unit 120 activates the BA timer to determine timeout in the BA sequence after the transmission of the BA frame.

Conversely, in a case in which it is determined in step S701 that the received frame is not the connected data frame, the reception side device 100R determines whether the received frame is a single data frame (step S711). Specifically, the data processing unit 110 determines whether the received frame is the single data frame including single data to which the aggregation is not applied.

When it is determined that the received frame is the single frame, the reception side device 100R determines whether the data payload is successfully received (step S712). Specifically, when it is determined that the received frame is the single data frame, the data processing unit 110 determines whether the data payload of the frame is successfully received.

When it is determined that the data payload is successfully received, the reception side device 100R determines whether the BA policy is "Delayed" (step S713). Specifically, the control unit 120 determines whether the set BA policy is "Delayed."

When the reception side device 100R determines that the BA policy is "Delayed," the reception side device 100R stores the sequence number (step S714). Specifically, in a case in which the BA policy is "Delayed," the control unit 120 causes the storage unit to store the sequence number of the data acquired by the data processing unit 110 from the data frame.

When the reception side device 100R determines that the BA policy is not "Delayed," the reception side device 100R determines whether the BA policy is "Immediate" (step S715). Specifically, the control unit 120 determines whether the set BA policy is "Immediate."

When the reception side device 100R determines that the BA policy is "Immediate," the reception side device 100R transmits an ACK frame (step S716). Specifically, when the BA policy is "Immediate," the control unit 120 causes the data processing unit 110 to construct the ACK frame of a normal ACK scheme in regard the data of the data frame, and the constructed ACK frame is transmitted by the wireless communication unit 130.

Moreover, of course, in a case in which the ACK return is not requested or the data frame is not successfully received, the BA frame and the ACK frame are not constructed and are not transmitted either.

2-4. Conclusion of Embodiment of the Present Disclosure

In this way, according to the embodiment of the present disclosure, the communication device 100 serving as the transmission side device transmits the first frame including the request parameter and at least one piece of data for the block ACK and receives the second frame including a confirmation response to the response parameter and the data for the block ACK. In addition, the communication device 100 serving as the reception side device receives the first frame including the request parameter and at least one piece of data for a block acknowledge (ACK) and transmits the second frame including the confirmation response to the response parameter and the data for the block ACK. Therefore, by executing exchange of the BA parameter and exchange of the data and the ACK in parallel, it is possible to further reduce a communication overhead occurring in use of the block ACK than in the BA sequence start process of the related art, for example, the ADDBA process. Thus, it is possible to improve a communication throughput.

In addition, the communication device 100 executes transmission of the data frame based on the response parameter included in the received second frame. In addition, the communication device 100 executes transmission of the block ACK based on the response parameter as a response to the data frame received after the transmission of the second frame. Therefore, by transmitting the data frame and the BA frame on the basis of the shared BA parameter, it is possible to improve reliability of the reception of the data frame and the BA frame.

In addition, the communication device 100 transmits the first frame on the basis of occurrence of a request for transmitting the data. Therefore, by transmitting the BA start frame including at least some of the data in accordance with occurrence of data desired to be transmitted, it is possible to shorten a time related to the transmission of the data.

In addition, on the basis of storing of the data in the transmission buffer 112, whether the request for transmitting the data occurs is determined. Therefore, by transmitting the BA start frame using storing of the data in the transmission buffer 112 as an opportunity, it is possible to simplify the process up to the transmission, and thus it is possible to further reduce the communication overhead.

In addition, the sequence number of the data included in the first frame is set as the start sequence number of the block ACK. Therefore, by omitting a start sequence number of the BA, it is possible to reduce an information amount of the BA start frame, and thus it is possible to reduce a communication amount.

In addition, the communication device 100 ends the transmission of the data frame based on the response parameter in a case in which the transmission of the data frame based on the response parameter is not executed for a predetermined period. In addition, the communication device 100 ends the transmission of the block ACK based on the response parameter in a case in which the data frame is not received for a predetermined period. Therefore, by ending the BA sequence without communication such as the DELBA process of the related art, it is possible to reduce a communication amount and simplify the process.

In addition, at least one of the request parameter and the response parameter includes information indicating the predetermined period. Therefore, by sharing a time until the end of the BA sequence between the transmission side device and the reception side device, it is possible to suppress inconsistency of the BA parameter, and thus it is possible to suppress occurrence of a communication failure.

In addition, the plurality of pieces of data are transmitted with the first frame or the data frame at one time. Therefore, the number of communications for transmission of data is reduced, and thus it is possible to improve communication efficiency.

In addition, the first frame or the data frame includes a plurality of pieces of connected data. Therefore, by using the aggregation used for an existing block ACK, it is possible to improve communication efficiency without mounting an additional function.

2-5. Modification Examples

The embodiment of the present disclosure has been described above. Moreover, an embodiment is not limited to the above-described examples. Hereinafter, first to third modification examples of the embodiment will be described.

First Modification Example

As a first modification example of the embodiment, the BA parameter may be changed in the BA sequence. Specifically, the transmission side device 100T transmits the BA start frame on the basis of occurrence of a request for changing the BA response parameter. In addition, the reception side device 100R transmits the BA response frame on the basis of the occurrence of the request for changing the BA response parameter.

Here, in the block ACK of the related art, a communication overhead is applied even to the change in the BA parameter. For example, in a case in which setting information related to a started BS sequence is changed in the block ACK of the related art, the BA sequence ends temporarily. Thereafter, the BA sequence is started again. This is because the parameters related to the BA sequence are managed in units of identifiers called TID and TID are allocated again in a case in which the parameters managed in TID are changed. For this reason, whenever setting information related to the BA sequence is changed, the above-described DELBA process and ADDBA process are executed. As a result, transmission of the data frame stands by and thus a communication overhead increases.

Figure 15:
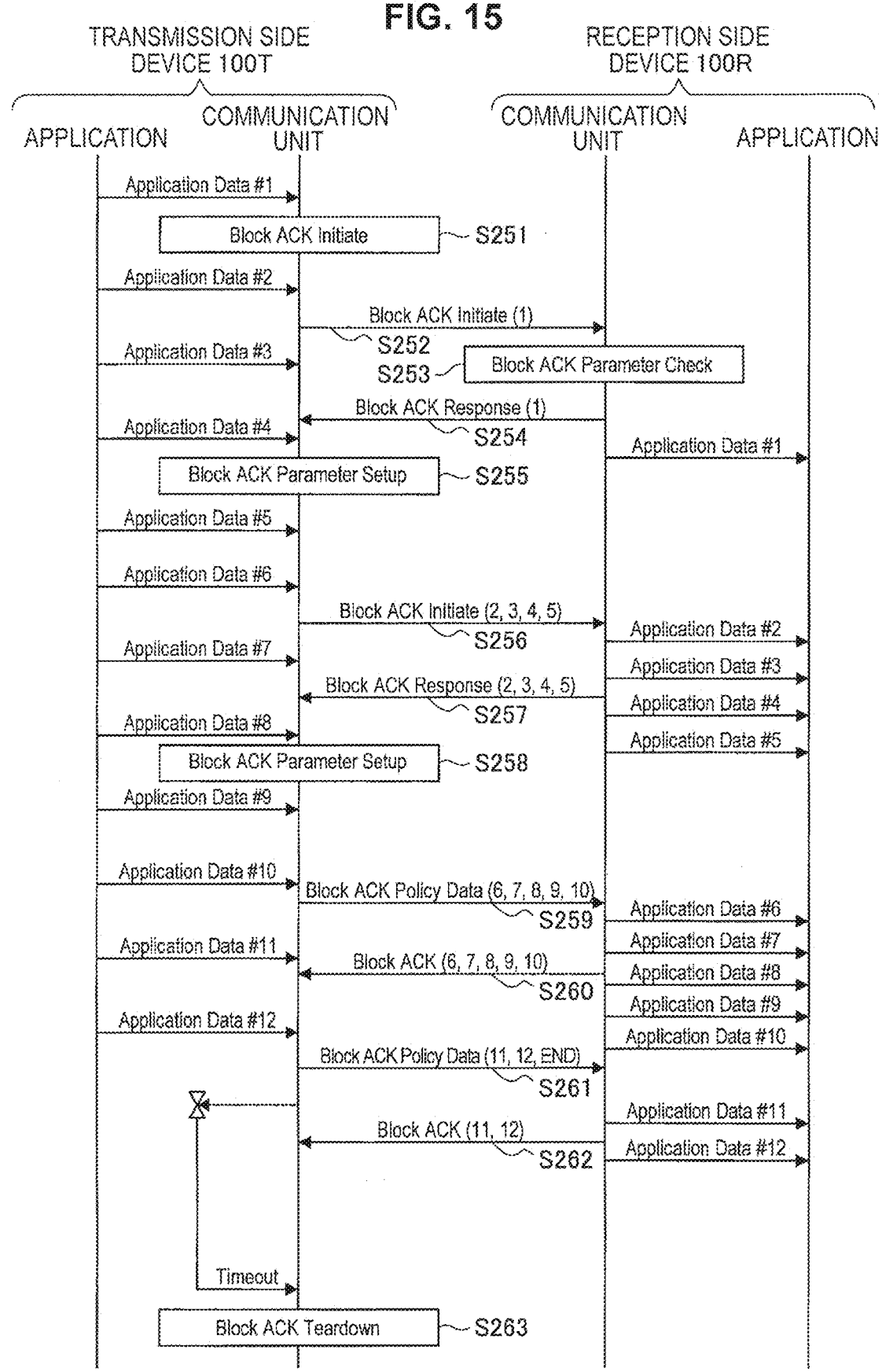
FIG. 15 is a sequence diagram illustrating a process related to a BA sequence of a communication device according to a first modification example of the embodiment.

Accordingly, in the modification example, the transmission side device 100T transmits a BA start frame in accordance with occurrence of a request for changing the BA parameter set on the basis of the BA response parameter. In addition, the reception side device 100R resets the BA parameter of the self-device on the basis of the BA start frame transmitted in accordance with the occurrence of the change request. Further, a process according to the modification example will be described in detail with reference to FIG. 15. FIG. 15 is a sequence diagram illustrating a process related to a BA sequence of the communication device 100 according to the first modification example of the embodiment. Moreover, the description of substantially the same process as the above-described process will be omitted.

When data transmission request occurs, the transmission side device 100T generates a BA start frame including application data #1 (step S251) and transmits the generated BA start frame to the reception side device 100R (step S252).

The reception side device 100R receiving the BA start frame sets the BA parameter (step S253) and transmits the BA response frame including the BA information regarding application data #1 to the transmission side device 100T (step S254).

The transmission side device 100T receiving the BA response frame sets the BA parameter (step S255). Moreover, a buffer size set herein may be, for example, 4.

Subsequently, the transmission side device 100T transmits the BA start frame including the number of pieces of data specified with the changed BA request parameter and the set BA parameter to the reception side device 100R (step S256). Specifically, in a case in which a request for changing the BA parameter occurs, the communication unit generates a BA start frame including the changed BA parameter as the BA request parameter. Then, the generated BA start frame is transmitted to the reception side device 100R. Moreover, the data transmitted herein may be, for example, four pieces of data, application data #2 to application data #5.

The reception side device 100R receiving the BA start frame again transmits the BA response frame as a response to the BA start frame (step S257). Specifically, the communication unit generates BA information regarding application data #2 to application data #5 acquired from the received BA start frame. In addition, the communication unit resets the BA parameter of the self-device on the basis of the BA request parameter included in the BA start frame.

The transmission side device 100T receiving the BA response frame resets the BA parameter (step S258). Specifically, the communication unit resets the BA parameter of the self-device on the basis of the BA response parameter included in the received BA response frame. Moreover, a buffer size reset herein may be, for example, 5.

Subsequently, the transmission side device 100T transmits the data frame including the number of pieces of data specified with the BA parameter to the reception side device 100R (step S259). Specifically, the communication unit generates an aggregation data frame by connecting the number of pieces of data specified on the basis of the reset BA parameter, for example, 5 pieces of data, application data #6 to application data #10. Then, the communication unit transmits the generated aggregation data frame to the reception side device 100R.

The reception side device 100R receiving the data frame transmits the BA frame as a response to the data frame (step S260). Specifically, when the aggregation data frame is received, the communication unit acquires application data #6 to application data #10 included in the frame. Then, the communication unit generates BA information regarding the acquired application data #6 to application data #10 and transmits the BA frame including the generated BA information to the transmission side device 100T.

Subsequently, the transmission side device 100T transmits the data frame including the number of pieces of data less than a number specified with the BA parameter (step S261) and the reception side device 100R receiving the data frame transmits the BA frame as a response to the data frame (step S262).

The transmission side device 100T receiving the BA frame ends the BA sequence when timeout occurs in the BA sequence (step S263).

Moreover, the example in which the request for changing the BA parameter occurs in the transmission side device 100T and the BA start frame and the BA response frame are exchanged has been described above. However, a request for changing the BA parameter may occur in the reception side device 100R and the BA response frame may be transmitted from the reception side device 100R to the transmission side device 100T in accordance with the occurrence of the BA parameter request. In this case, the BA start frame is not transmitted from the transmission side device 100T.

In this way, according to the first modification example of the embodiment, the transmission side device 100T transmits the BA start frame on the basis of the occurrence of the request for changing the BA response parameter. In addition, the reception side device 100R transmits the BA response frame on the basis of the occurrence of the request for changing the BA response parameter. Therefore, the BA start sequence is prevented from end and start whenever the BA parameter is changed, and thus it is possible to further reduce a communication overhead related to the change in the BA parameter than the block ACK of the related art.

Second Modification Example

As a second modification example of the embodiment, data transmitted in the BA sequence at one time may be decided on the basis of the size of the data, instead of the buffer size, that is, the number of pieces of data.

Here, in the block ACK of the related art, use efficiency of the reception buffer of the reception side device deteriorates in some cases. For example, in the Buffer Size field of the BA parameter in the block ACK of the related art, the number of MSDUs (MPDUs) is stored. Therefore, the reception side device generally ensures a capacity of the reception buffer for the BA sequence on the basis of the upper limit of the data size of the MSDU (MPDU) and the number of MSDUs (MPDUs) stored in the Buffer Size field. Moreover, the number of pieces of data exceeding the buffer size is not stored in the reception buffer.

However, the actually received size of the MSDU (MPDU) is less than the upper limit in some cases. In this case, in the ensured capacity of the reception buffer, an amount equivalent to a difference from the upper limit is not used. As a result, use efficiency of the reception buffer deteriorates. In addition, for a device such as a portable terminal in which it is difficult to mount a memory with a sufficient capacity, it may thus be difficult to ensure the capacity of the reception buffer.

Accordingly, in the modification example, the BA request parameter includes information regarding the size of data stored in the transmission buffer. The BA response parameter includes information related to the size of data allowed to be stored in the reception buffer 115.

Specifically, the transmission side device 100T includes information indicating a sum of sizes of at least some of the pieces of data stored in the transmission buffer 112 (hereinafter also referred to as data size information) in the BA request parameter. Then, the transmission side device 100T transmits the BA start frame including the BA request parameter to the reception side device 100R.

The reception side device 100R receiving the BA start frame sets a buffer size of the self-device on the basis of the data size information included in the BA request parameter of the BA start frame and a capacity (size) ensured for the BA sequence in the reception buffer 115 of the self-device. Then, the reception side device 100R generates a BA response parameter including the set buffer size and transmits the BA response frame including the BA response parameter to the transmission side device 100T.

The transmission side device 100T receiving the BA response frame sets the buffer size in the BA parameter of the self-device to the buffer size included in the BA response parameter of the BA response frame.

Moreover, the example in which the buffer size is notified of has been described above, but the data size information may be notified of. In this case, the transmission side device 100T specifies the buffer size from the data size information included in the BA response parameter of the received BA response frame and executes data aggregation in accordance with the specified buffer size. Further, the reception side device 100R may be notified of the buffer size specified by the transmission side device 100T using the BA start frame.

In this way, according to the second modification example of the embodiment, the BA request parameter includes the information regarding the size of the data stored in the transmission buffer. The BA response parameter includes the information regarding the size of the data allowed to be stored in the reception buffer 115. Therefore, by deciding the data to be transmitted in accordance with the size of the data, it is possible to improve use efficiency of the reception buffer 115 in regard to the BA sequence of the reception side device 100R.

Third Modification Example

As a third modification example of the embodiment, data may be communicated using multiplexing communication. Specifically, a data frame transmitted on the basis of the BA start frame or the BA response parameter (hereinafter also referred to as a data transmission frame) is multiplexed. For example, the data transmission frame is transmitted using time division multiplexing, frequency division multiplexing, code division multiplexing, orthogonal frequency division multiplexing, or space division multiplexing.

Moreover, the multiplexing of the data transmission frame may be used with data connection, that is, data aggregation.

In this way, according to the third modification example of the embodiment, the data transmission frame is multiplexed. Therefore, even when at least one of the transmission side device 100T and the reception side device 100R does not have a frame aggregation function, it is possible to improve data transmission efficiency. Further, in a case in which frequency division multiplexing, orthogonal frequency division multiplexing, or space division multiplexing is used, it is possible to further improve use efficiency of communication resources.

3. Application Examples

The technology according to the present disclosure is applicable to various products. For example, the communication device 100 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the communication device 100 may be implemented as a terminal (also referred to as machine type communication (MTC) terminal) which performs machine-to-machine (M2M) communication, such as smart meters, vending machines, remote monitoring devices, or point of sale (POS) terminals. Furthermore, the communication device 100 may be a wireless communication module mounted in such terminals (e.g., integrated circuit modules including one die).

On the other hand, for example, the communication device 100 may be implemented as a wireless LAN access point (also referred to as a wireless base station) having or not having a router function. In addition, the communication device 100 may be implemented as a mobile wireless LAN router. Furthermore, the communication device 100 may be a wireless communication module (e.g., integrated circuit modules including one die) mounted on these devices.

3-1. First Application Example

Figure 16:
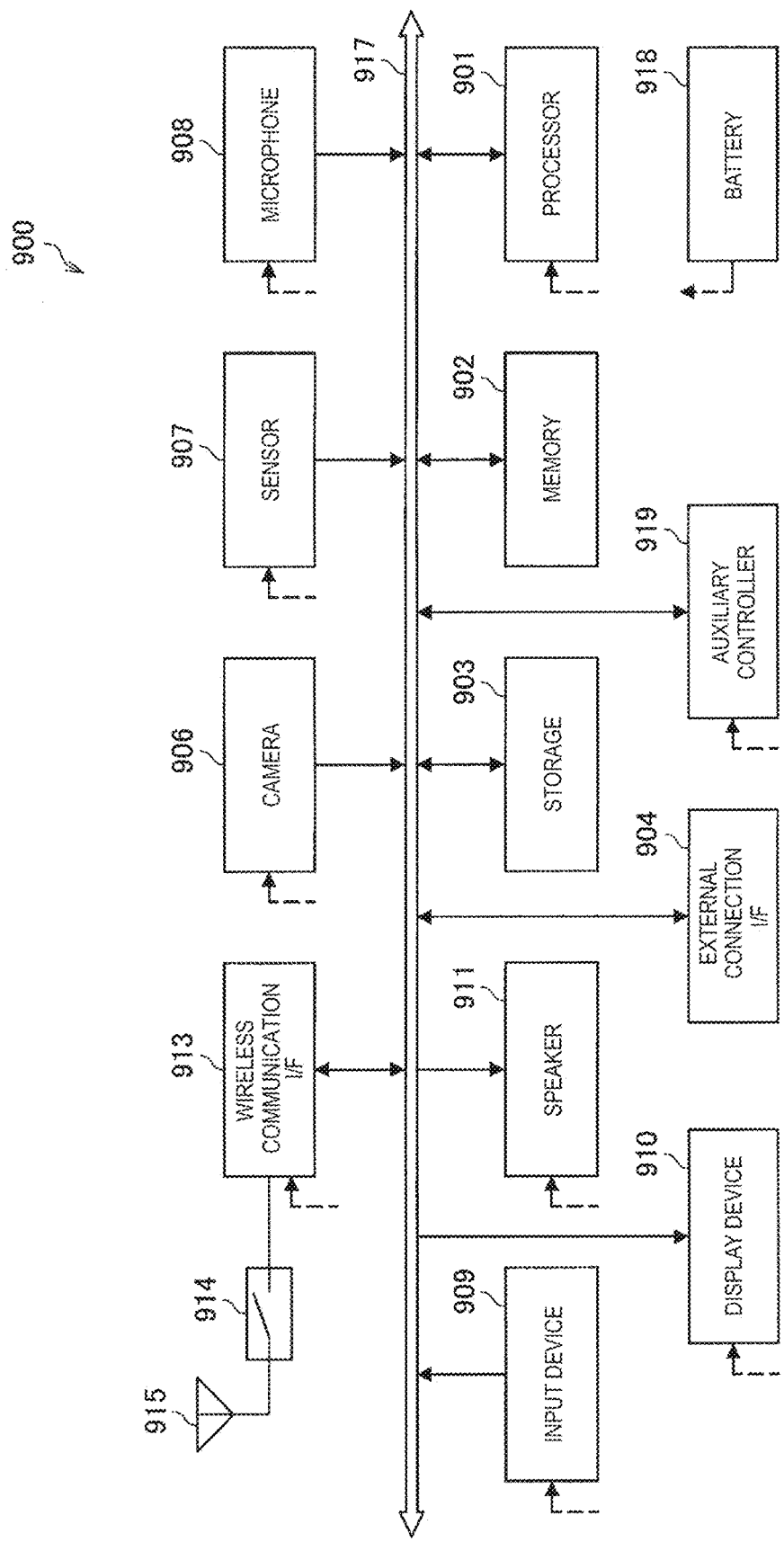
FIG. 16 is a block diagram illustrating an example of a schematic configuration of a smartphone.

FIG. 16 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The external connection interface 904 is an interface for connecting an externally attached device such as a memory card or a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group including, for example, a positioning sensor, a gyro sensor, a geomagnetic sensor, an acceleration sensor, and the like. The microphone 908 converts voice input to the smartphone 900 into an audio signal. The input device 909 includes, for example, a touch sensor that detects touches on a screen of the display device 910, a key pad, a keyboard, buttons, switches, and the like, and accepts an operation or information input from a user. The display device 910 includes a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more of wireless LAN standards such as IEEE 802.11a, 11b, 11g, 11n, 11ac, and 11ad, and executes wireless LAN communication. The wireless communication interface 913 can communicate with other devices via a wireless LAN access point in an infrastructure mode. In addition, the wireless communication interface 913 can directly communicate with other devices in a direct communication mode such as an ad hoc mode, or Wi-Fi Direct (registered trademark). Note that, in Wi-Fi Direct mode, unlike the ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 includes a single antenna element or a plurality of antenna elements (e.g., a plurality of antenna elements included in a MIMO antenna), and is used for transmission and reception of a wireless signal through the wireless communication interface 913.

Note that the configuration of the smartphone 900 is not limited to the example of FIG. 16, and the smartphone 900 may include a plurality of antennas (e.g., an antenna for a wireless LAN and an antenna for a close proximity wireless communication scheme). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 16 via a power supply line partially indicated by dashed lines in the figure. The auxiliary controller 919 causes the required minimum functions of the smartphone 900 to operate, for example, in the sleep mode.

In the smartphone 900 illustrated in FIG. 16, the data processing unit 110, the control unit 120, and the wireless communication unit 130 described with reference to FIG. 6 may be mounted on the wireless communication interface 913. In addition, at least some of these functions may be mounted on the processor 901 or the auxiliary controller 919. For example, by executing exchange of the BA parameter and exchange of the data and the ACK in parallel between the smartphone 900 and a communication partner, it is possible to further reduce a communication overhead occurring in use of the block ACK than a communication overhead occurring in use of the block ACK sequence of the related art.

Note that the smartphone 900 may operate as a wireless access point (software AP) by the processor 901 executing an access point function at the application level. In addition, the wireless communication interface 913 may have the wireless access point function.

3-2. Second Application Example

Figure 17:
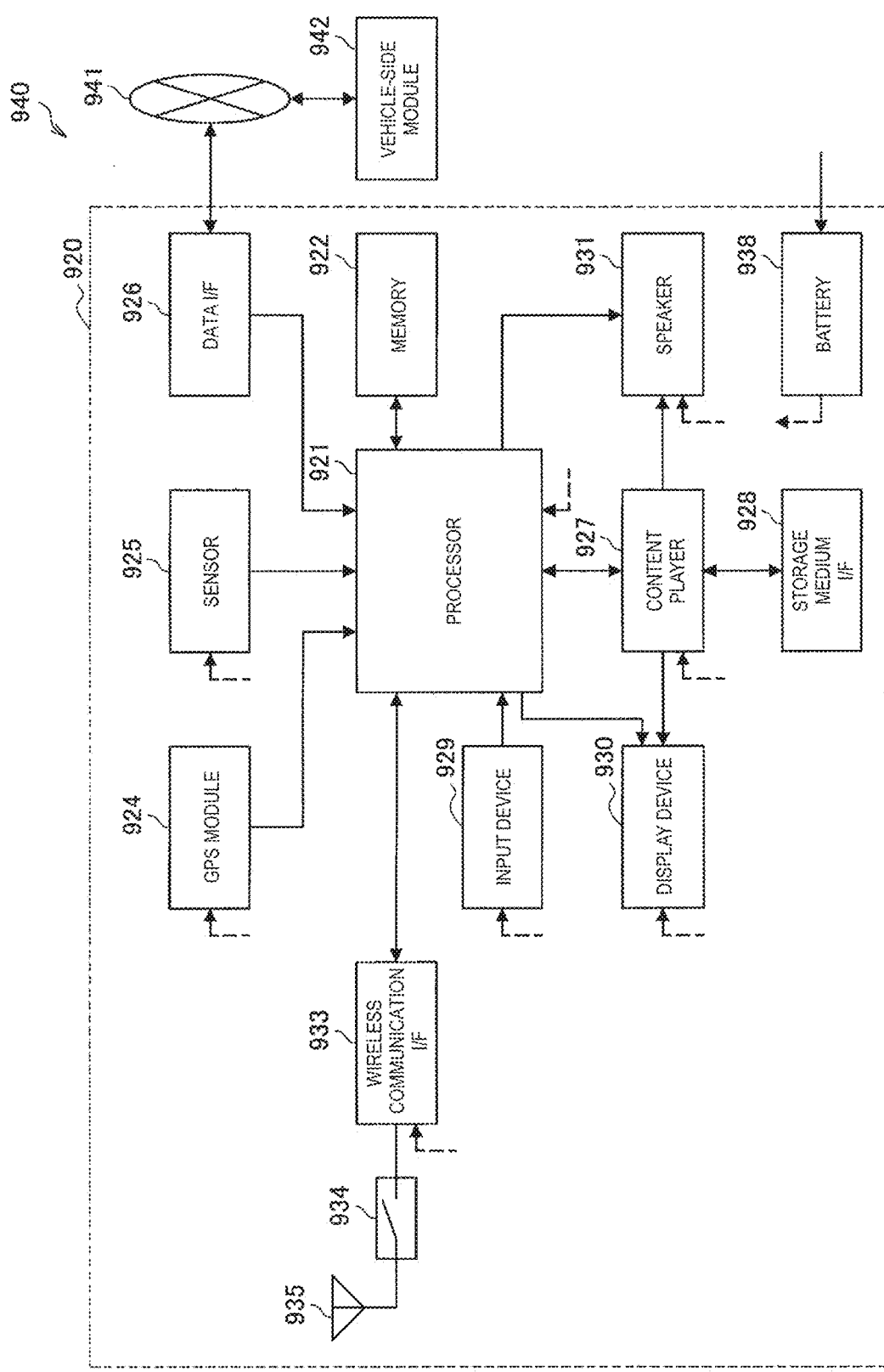
FIG. 17 is a block diagram illustrating an example of a schematic configuration of a car navigation device.

FIG. 17 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, for example, a gyro sensor, a geomagnetic sensor, and a barometric sensor. The data interface 926 is connected to, for example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, for example, a touch sensor that detects touches on a screen of the display device 930, buttons, switches, and the like, and accepts an operation or information input from the user. The display device 930 includes a screen such as an LCD or an OLED display, and displays a navigation function or an image of content to be reproduced. The speaker 931 outputs sound of the navigation function or the content to be reproduced.

The wireless communication interface 933 supports one or more of wireless LAN standards such as IEEE 802.11a, 11b, 11g, 11n, 11ac, and 11ad, and executes wireless LAN communication. The wireless communication interface 933 can communicate with other devices via a wireless LAN access point in an infrastructure mode. In addition, the wireless communication interface 933 can directly communicate with other devices in a direct communication mode, such as an ad hoc mode and Wi-Fi Direct. The wireless communication interface 933 can typically include a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 includes a single antenna element or a plurality of antenna elements, and is used for transmission and reception of a wireless signal through the wireless communication interface 933.

Note that the configuration of the car navigation device 920 is not limited to the example of FIG. 17, and the car navigation device 920 may include a plurality of antennas. In this case, the antenna switch 934 may be omitted from the configuration of the car navigation device 920.

The battery 938 supplies electric power to each of the blocks of the car navigation device 920 illustrated in FIG. 17 via a power supply line partially indicated by a dashed line in the figure. In addition, the battery 938 accumulates electric power supplied from the vehicle side.

In the car navigation device 920 illustrated in FIG. 17, the data processing unit 110, the control unit 120, and the wireless communication unit 130 described with reference to FIG. 6 may be mounted on the wireless communication interface 933. In addition, at least some of these functions may be mounted on the processor 921. For example, by executing exchange of the BA parameter and exchange of the data and the ACK in parallel between the car navigation device 920 and a communication partner, it is possible to further reduce a communication overhead occurring in use of the block ACK than a communication overhead occurring in use of the block ACK sequence of the related art.

Further, the wireless communication interface 933 may provide wireless connection to a terminal carried by a user who rides in a vehicle.

Further, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

3-3. Third Application Example

Figure 18:
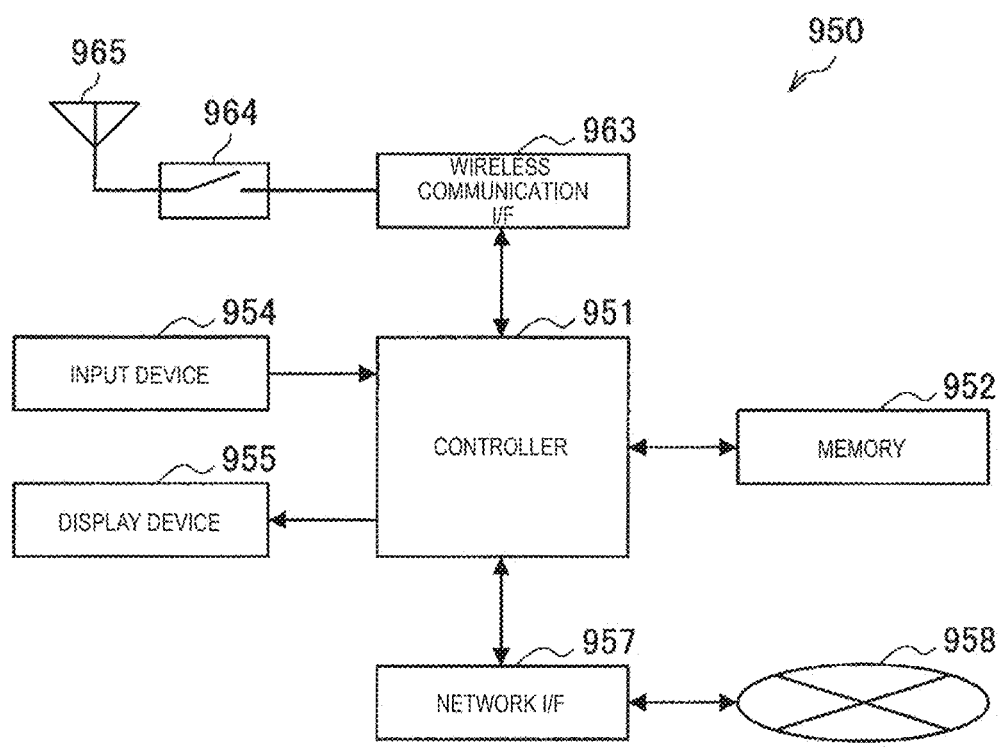
FIG. 18 is a block diagram illustrating an example of a schematic configuration of a wireless access point.

FIG. 18 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes various functions (e.g., access restriction, routing, encryption, firewall, log management, and the like) of the Internet Protocol (IP) layer and higher layers of the wireless access point 950 to be operated. The memory 952 includes a RAM and a ROM, and stores a program to be executed by the controller 951 and various kinds of control data (e.g., a terminal list, a routing table, an encryption key, security settings, a log, and the like).

The input device 954 includes, for example, a button, a switch, or the like and accepts an operation from a user. The display device 955 includes an LED lamp or the like, and displays operation status of the wireless access point 950.

The network interface 957 is a wired communication interface for the wireless access point 950 to connect to the wired communication network 958. The network interface 957 may include a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad, and provides wireless connection to a neighboring terminal as an access point. The wireless communication interface 963 can typically include a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 includes a single antenna element or a plurality of to antenna elements, and is used for transmission and reception of a wireless signal through the wireless communication interface 963.

In the wireless access point 950 illustrated in FIG. 18, the data processing unit 110, the control unit 120, and the wireless communication unit 130 described with reference to FIG. 6 may be mounted on the wireless communication interface 963. In addition, at least some of these functions may be mounted on the controller 951. For example, by executing exchange of the BA parameter and exchange of the data and the ACK in parallel between the wireless access point 950 and a communication partner, it is possible to further reduce a communication overhead occurring in use of the block ACK than a communication overhead occurring in use of the block ACK sequence of the related art.

4. Conclusion

In this way, according to the embodiment of the present disclosure, by executing exchange of the BA parameter and exchange of the data and the ACK in parallel, it is possible to further reduce a communication overhead occurring in use of the block ACK than in the BA sequence start process of the related art, for example, the ADDBA process. Thus, it is possible to improve a communication throughput.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, one data frame including the aggregated data has been transmitted and the BA frame has been transmitted in accordance with the data frame, but the present technology is not limited to the example. For example, a plurality of data frames may be transmitted and one BA frame may be transmitted in accordance with the plurality of data frames.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)
A communication device including:
a communication unit configured to transmit a first frame including a request parameter and at least one piece of data for a block acknowledge (ACK) and receive a second frame including a confirmation response to a response parameter and the data for the block ACK.

(2)
The communication device according to (1),
in which the communication unit executes transmission of a data frame based on the response parameter included in the received second frame.

(3)
The communication device according to (2),
in which the communication unit transmits the first frame on a basis of occurrence of a request for transmitting the data.

(4)
The communication device according to (3),
in which the communication unit determines whether the request for transmitting the data occurs on a basis of storing of the data in a transmission buffer.

(5)
The communication device according to (2),
in which the communication unit transmits the first frame on a basis of occurrence of a request for changing the response parameter.

(6)
The communication device according to any one of (2) to (5),
in which the request parameter includes information regarding a size of data stored in a transmission buffer.

(7)
The communication device according to any one of (2) to (6),
in which a sequence number of the data included in the first frame is set as a start sequence number of the block ACK.

(8)
The communication device according to any one of (2) to (7),
in which the communication unit ends the transmission of the data frame based on the response parameter in a case in which the transmission of the data frame based on the response parameter is not executed for a predetermined period.

(9)
The communication device according to (8),
in which at least one of the request parameter and the response parameter includes information indicating the predetermined period.

(10)
The communication device according to any one of (2) to (9),
in which the plurality of pieces of data are transmitted with the first frame or the data frame at one time.

(11)
The communication device according to (10),
in which the first frame or the data frame includes the plurality of pieces of data that are connected.

(12)
The communication device according to (10) or (11),
in which the first frame or the data frame is multiplexed.

(13)
A communication device including:
a communication unit configured to receive a first frame including a request parameter and at least one piece of data for a block acknowledge (ACK) and transmit a second frame including a confirmation response to a response parameter and the data for the block ACK.

(14)
The communication device according to (13),
in which the communication unit executes transmission of the block ACK based on the response parameter as a response to a data frame received after transmission of the second frame.

(15)
The communication device according to (14),
in which the response parameter includes information regarding a size of data allowed to be stored in a reception buffer.

(16)
The communication device according to (14) or (15),
in which the communication unit sets a sequence number of the data included in the first frame as a start sequence number of the block ACK.

(17)
The communication device according to any one of (14) to (16),
in which the communication unit ends the transmission of the block ACK based on the response parameter in a case in which the data frame is not received for a predetermined period.

(18)
The communication device according to any one of (14) to (17),
in which the communication unit transmits the second frame on a basis of occurrence of a request for changing the response parameter.

(19)
A communication method including:
transmitting, by a communication unit, a first frame including a request parameter and data for a block acknowledge (ACK); and
receiving a second frame including a confirmation response to a response parameter and the data for the block ACK.

(20)
A communication method including:
receiving, by a communication unit, a first frame including a request parameter and data for a block acknowledge (ACK); and
transmitting a second frame including a confirmation response to a response parameter and the data for the block ACK.

REFERENCE SIGNS LIST 100 communication device
100A transmission side device
100B reception side device
110 data processing unit
112 transmission buffer
115 reception buffer
120 control unit
130 wireless communication unit

The invention claimed is:

1. A communication device comprising: transceiver circuitry configured to
transmit, to another communication device, a first frame including both a block ACK (BA) request parameter for requesting to transmit a data frame and at least one piece of data, the first frame being based on a request for transmitting the at least one piece of data, and
receive, from the another communication device, a second frame including a BA response parameter for the data frame and also including a confirmation response to the at least one piece of data, wherein the transceiver circuitry is further configured to determine whether the request for transmitting the at least one piece of data occurs based on storing of the at least one piece of data in a transmission buffer.

2. The communication device according to claim 1, wherein the transceiver circuitry is further configured to schedule a transmission of the data frame based on the BA response parameter included in the received second frame.

3. The communication device according to claim 1, wherein the transceiver circuitry is further configured to transmit a request for changing the BA response parameter.

4. The communication device according to claim 1, wherein the BA request parameter includes information regarding a size of data stored in a transmission buffer.

5. The communication device according to claim 1, wherein a sequence number of the at least one piece of data included in the first frame is set as a start sequence number of a block ACK.

6. The communication device according to claim 2, wherein the transceiver circuitry is further configured to cancel the transmission of the data frame in a case in which the transmission of the data frame is not executed within a predetermined period.

7. The communication device according to claim 6, wherein at least one of the BA request parameter or the BA response parameter includes information indicating the predetermined period.

8. The communication device according to claim 1, wherein the at least one piece of data includes a plurality of pieces of data, where the plurality of pieces of data are transmitted with the first frame or the data frame at one time.

9. The communication device according to claim 8, wherein the plurality of pieces of data the first frame or the data frame are aggregated according to the BA response parameter.

10. The communication device according to claim 8, wherein the first frame or the data frame comprises a multiplexed frame.

11. A communication device comprising: transceiver circuitry configured to
receive, from another communication device, a first frame including both a block ACK (BA) request parameter for requesting to transmit a data frame and at least one piece of data, the first frame being based on a request for transmitting the at least one piece of data in the another communication device, and
transmit, to the another communication device, a second frame including a BA response parameter for the data frame and also including a confirmation response to the at least one piece of data, wherein whether the request for transmitting the at least one piece of data occurs is determined in the another communication device based on storing of the at least one piece of data in a transmission buffer.

12. The communication device according to claim 11, wherein the transceiver circuitry is further configured to schedule a reception of the data frame based on the BA response parameter included in the transmitted second frame.

13. The communication device according to claim 11, wherein the BA response parameter includes information regarding a size of data allowed to be stored in a reception buffer.

14. The communication device according to claim 11, wherein a sequence number of the at least one piece of data included in the first frame is set as a start sequence number of a block ACK.

15. The communication device according to claim 12, wherein the transceiver circuitry is further configured to cancel the transmission of the block ACK in a case in which the data frame is not received within a predetermined period.

16. The communication device according to claim 11, wherein the transceiver circuitry is further configured to receive and process a request for changing the BA response parameter.

17. A communication method performed by transceiver circuitry of a device, the method comprising:
transmitting, by the transceiver circuitry to another device, a first frame including both a block ACK (BA) request parameter for requesting to transmit a data frame and at least one piece of data, the first frame being based on a request for transmitting the at least one piece of data, and
receiving, from the another device, a second frame including a BA response parameter for the data frame and also including a confirmation response to the at least one piece of data, wherein the transceiver circuitry is further performs determining whether the request for transmitting the at least one piece of data occurs based on storing of the at least one piece of data in a transmission buffer.

18. A communication method performed by transceiver circuitry of a device, the method comprising:

receiving, by the transceiver circuitry from another device, a first frame including both a block ACK (BA) request parameter for requesting to transmit a data frame and at least one piece of data, the first frame being based on a request for transmitting the at least one piece of data in the another device, and transmitting, to the another device, a second frame including a BA response parameter for the data frame and also including a confirmation response to the at least one piece of data, wherein whether the request for transmitting the at least one piece of data occurs is determined in the another device based on storing of the at least one piece of data in a transmission buffer.

\* \* \* \* \*